United States Patent
Yokoyama et al.

(10) Patent No.: US 9,325,202 B2
(45) Date of Patent: Apr. 26, 2016

(54) POWER CONTROL DEVICE, POWER CONTROL METHOD, AND FEED SYSTEM

(75) Inventors: Masayuki Yokoyama, Tokyo (JP); Tomotaka Miyashiro, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 590 days.

(21) Appl. No.: 13/877,292

(22) PCT Filed: Sep. 14, 2011

(86) PCT No.: PCT/JP2011/070942
§ 371 (c)(1),
(2), (4) Date: Apr. 1, 2013

(87) PCT Pub. No.: WO2012/046549
PCT Pub. Date: Apr. 12, 2012

(65) Prior Publication Data
US 2013/0181655 A1    Jul. 18, 2013

(30) Foreign Application Priority Data

Oct. 7, 2010   (JP) ................................. 2010-227143

(51) Int. Cl.
*H02J 7/35*     (2006.01)
*H02M 3/155*    (2006.01)

(52) U.S. Cl.
CPC  *H02J 7/35* (2013.01); *H02M 3/155* (2013.01); *Y02E 10/566* (2013.01)

(58) Field of Classification Search
CPC .................................. H02M 3/155; H02J 7/35
See application file for complete search history.

(56) References Cited

U.S. PATENT DOCUMENTS

| | | | | |
|---|---|---|---|---|
| 7,821,225 B2* | 10/2010 | Chou | ....................... | H02J 9/061 320/103 |
| 2006/0171182 A1* | 8/2006 | Siri | .................... | H02M 3/33592 363/131 |
| 2009/0001926 A1* | 1/2009 | Sato | ....................... | B60L 3/0046 320/102 |
| 2009/0289594 A1 | 11/2009 | Sato | | |
| 2011/0134668 A1* | 6/2011 | Cho | .......................... | G05F 1/67 363/78 |

FOREIGN PATENT DOCUMENTS

| | | |
|---|---|---|
| CN | 101821858 | 9/2010 |
| JP | 62-154122 | 7/1987 |
| JP | 06-014473 | 1/1994 |
| JP | 07-079535 | 3/1995 |

(Continued)

OTHER PUBLICATIONS

The State Intellectual Property Office of The People's Republic of China, Notification of the First Office Action issued in connection with Application No. 2011800474958, dated Apr. 21, 2014. (21 pages).

(Continued)

*Primary Examiner* — Emily P Pham
(74) *Attorney, Agent, or Firm* — Hazuki International, LLC

(57) ABSTRACT

Provided is a power control device including a power path switching unit, a voltage conversion unit, a characteristic measurement circuit, and a control unit, wherein the power path switching unit forms a path in which an output of the power generating element is connected to the storage element side by connecting the power generating element to the voltage conversion unit, or a path in which the power generating element is directly connected to the storage element side according to the path switching signal.

39 Claims, 29 Drawing Sheets

(56) References Cited

FOREIGN PATENT DOCUMENTS

| JP | 11-046457 | 2/1999 |
| JP | 2003-134690 | 5/2003 |
| JP | 3795370 | 7/2006 |
| WO | 2008/018250 | 2/2008 |
| WO | 2011/062088 | 5/2011 |
| WO | 2011/108412 | 9/2011 |

OTHER PUBLICATIONS

Japanese Office Action issued Sep. 9, 2014, for corresponding Japanese Appln. No. 2010-227143.

* cited by examiner

33A

FIG. 19
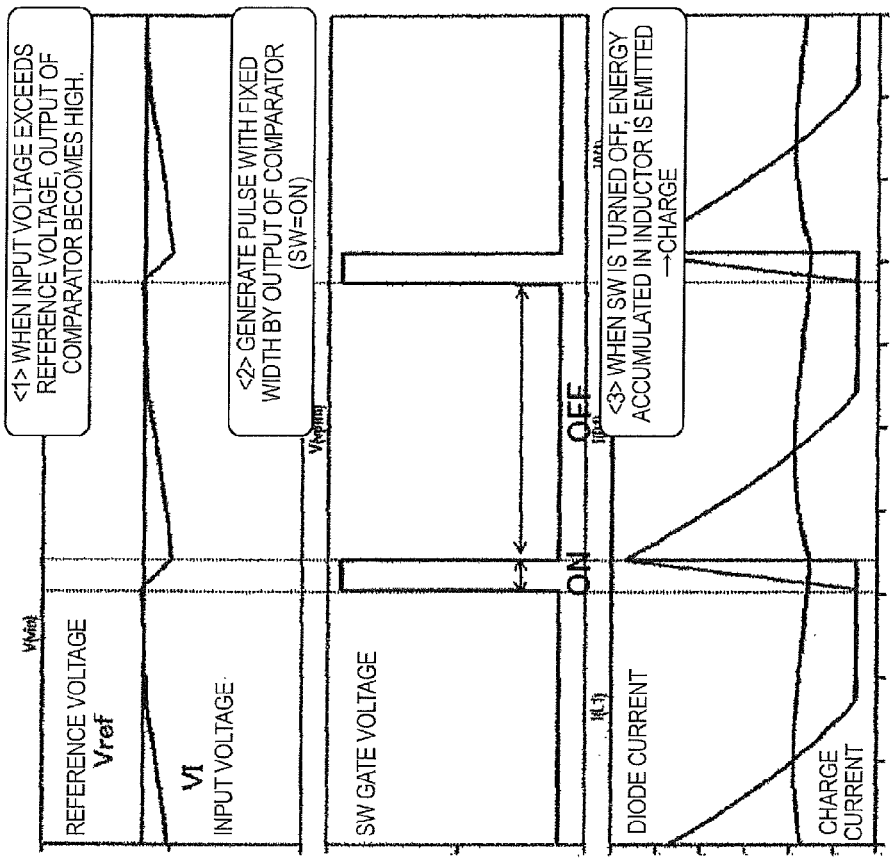
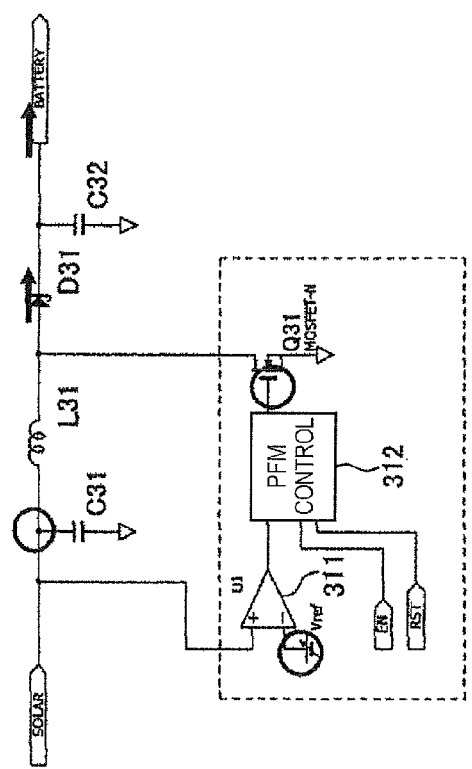

POWER CONTROL DEVICE, POWER CONTROL METHOD, AND FEED SYSTEM

CROSS REFERENCES TO RELATED APPLICATIONS

The present application is a national stage of International Application No. PCT/JP2011/070942 filed on Sep. 14, 2011 and claims priority to Japanese Patent Application No. 2010-227143 filed on Oct. 7, 2010, the disclosure of which is incorporated herein by reference.

BACKGROUND

Technical Field

The present disclosure relates to a power control device, a power control method, and a feed system for controlling supply of power generated in a power generating element.

The development of clean energy that does not cause carbon dioxide and contaminants to be emitted has been sought as a measure for protecting the environment. Above all, photovoltaic power generation and wind force power generation have been widely spread in recent years.

In particular, as low prices and high efficiency in power generation have progressed in solar batteries (solar panels) that can be installed on roofs of houses, or the like, power generating elements have been also gradually distributed to ordinary households.

In addition, in such photovoltaic elements, the size thereof have miniaturized and sales of mobile telephones mounted with solar batteries and the like have started as well.

Properties of a solar battery are different from those of a constant-voltage source such as a battery, or the like, and a solar battery has a property that a current source is dependent on a voltage between terminals.

For this reason, to obtain the maximum output from a solar battery, it is necessary to make a voltage of a load connected to the solar battery coincide with the maximum power point voltage of the solar battery.

In addition, there is only one maximum power point (MPP) at which power is maximized in current-voltage characteristics of a solar battery.

However, since the current-voltage characteristics of a solar battery change depending on environments such as illuminance, temperature, and the like, it is necessary to perform control to obtain the maximum power point voltage during an operation of a solar battery-connected device.

Such control to obtain the maximum power point during an operation of a device is called MPPT (Maximum Power Point Tracking) control.

Various charge control methods for charging a storage battery that is a load using such a solar battery have been proposed.

In general, a charge control method in which full-charge detection is performed by comparing a terminal open voltage of a storage value to that of a threshold value is known (for example, refer to Patent Literature 1).

In the charge control method of Patent Literature 1, in a first step, charging and opening are repeated at a fixed time interval. In a second step, charging is stopped when an open voltage is equal to or higher than a fixed voltage. Then, in a third step, when a voltage is lower than or equal to a charge resuming voltage, the process returns to the first step again and charging is resumed.

In addition, many techniques of executing MPPT control have been proposed, but as one technique in a direct-current (DC) path, the following technology is known (for example, refer to Patent Literature 2).

This technology is a charge control method to which a DC-DC converter which charges a storage battery using a load by stepping a DC voltage generated from a solar battery up or down is applied. In this charge control method, an input voltage and an output voltage are compared, and if the ratio thereof is within a fixed range, the DC-DC converter is disconnected from a load side, and the solar battery and the storage voltage are directly connected (direct coupling).

CITATION LIST

Patent Literature

Patent Literature 1: Japanese Patent No. 3795370
Patent Literature 1: JP 1987-154122A

SUMMARY

Technical Problem

However, the charge control method disclosed in Patent Literature 1 has the following disadvantages.

In the case of a solar battery, since power generated upon opening is discarded, if a ratio of a opening time is high, the time until full charging is reached is lengthened.

If a time interval from one opening to the next opening is long, there is concern of overcharging due to delayed detection of full charge.

Since opening is performed even when the amount of charge is insufficient, a charging time is lengthened.

In addition, in the charge control method disclosed in Patent Literature 2, an input voltage and an output voltage are compared, and when the ratio thereof is within a fixed range, step-up is performed to be switched to direct coupling, but when switching to direct coupling is attained, there are cases in which power at the maximum power point becomes small or power generation is not possible depending on the threshold value of the ratio thereof.

The present disclosure is directed to provide a power control device, a power control method, and a feed system which enable control of maintenance of a maximum power point of a power generating element such as a solar battery, and avoidance of power losses.

Solution to Problem

According to a first embodiment of the present disclosure, there is provided a power control device including a power path switching unit that is able to be connected to a power generating element and switches a power path to a storage element on a load side according to a path switching signal, a voltage conversion unit that converts a voltage level of power generated in the power generating element and supplied through the power path switching unit so as to be able to be supplied to the storage element on the load side, a characteristic measurement circuit that has a function of measuring an open voltage of the power generating element and obtains a maximum power point voltage of the power generating element based on the measured open voltage, and a control unit that outputs, to the power path switching unit, the path switching signal according to a comparison result between the storage element on the load side and a switching threshold value generated according to at least the magnitude relationship between a voltage of the storage element on the load side and the maximum power point voltage out of the open voltage and the maximum power point voltage of the power generating element. The power path switching unit forms a path in which an output of the power generating element is connected to the storage element side by connecting the power generating element to the voltage conversion unit, or a path in which the power generating element is directly connected to the storage element side according to the path switching signal.

According to the first embodiment of the present disclosure, there is provided a power control method when a power path is switched in which a power generating element is to be connected to a voltage conversion unit that is able to supply a voltage to the storage element on the load side or directly connected to the storage element on the load side by converting a voltage level of power generated in the power generating element including measuring an open voltage of the power generating element, acquiring a maximum power point voltage of the power generating element based on the measured open voltage, setting a switching threshold value according to at least the magnitude relationship between a voltage of the storage element on the load side and the maximum power point voltage out of the open voltage and the maximum power point voltage of the power generating element, and forming a path in which an output of the power generating element is connected to the storage element side by connecting the power generating element to the voltage conversion unit or a path in which the power generating element is directly connected to the storage element side according to a comparison result of the storage element on the load side and the switching threshold value.

According to a second embodiment of the present disclosure, there is provided a feed system including a power generating element that generates power, a storage element that stores the power generated in the power generating element, and a power control device that supplies the power of the power generating element to the storage element on a load side. The power control device includes a power path switching unit that is able to be connected to a power generating element and switches a power path to a storage element on a load side according to a path switching signal; a voltage conversion unit that converts a voltage level of power generated in the power generating element and supplied through the power path switching unit so as to be able to be supplied to the storage element on the load side, a characteristic measurement circuit that has a function of measuring an open voltage of the power generating element and obtains a maximum power point voltage of the power generating element based on the measured open voltage, and a control unit that outputs, to the power path switching unit, the path switching signal according to a comparison result between the storage element on the load side and a switching threshold value generated according to at least the magnitude relationship between a voltage of the storage element on the load side and the maximum power point voltage out of the open voltage and the maximum power point voltage of the power generating element. The power path switching unit forms a path in which an output of the power generating element is connected to the storage element side by connecting the power generating element to the voltage conversion unit, or a path in which the power generating element is directly connected to the storage element side according to the path switching signal.

According to a third embodiment of the present disclosure, there is provided a power control device including a control unit that performs control to charge power generated in a power generating element in a storage element on a load side. The control unit monitors a voltage of the storage element, and when a voltage of a terminal of the storage element during opening reaches or exceeds a full charge voltage, or when the difference between the charge voltage of the storage element before opening and the voltage during opening of the terminal of the storage element reaches or is below a given value, performs charge control to stop charging, and changes a terminal opening time interval of the storage element according to a voltage or a current of the storage element or the power generating element.

Further, according to the third first embodiment of the present disclosure, there is provided a power control device including a control unit that performs control to charge power generated in a power generating element in a storage element on a load side. The control unit monitors a voltage of the storage element, and when a voltage of a terminal of the storage element during opening reaches or exceeds a full charge voltage, or when the difference between the charge voltage of the storage element before opening and the voltage during opening of the terminal of the storage element reaches or is below a given value, performs charge control to stop charging, and controls so that full charge with the terminal of the storage element open is not detected until the voltage of the storage element reaches the full charge voltage.

Further, according to the third embodiment of the present disclosure, there is provided a power control method when charge control of power generated from a power generating element is performed for a storage element on a load side including monitoring a voltage of the storage element, and when a voltage of a terminal of the storage element during opening reaches or exceeds a full charge voltage, or when the difference between the charge voltage of the storage element before opening and the voltage during opening of the terminal of the storage element reaches or is below a given value, performing charge control to stop charging, and changing a terminal opening time interval of the storage element according to a voltage or a current of the storage element or the power generating element.

Further, according to the third embodiment of the present disclosure, there is provided a power control method when charge control of power generated from a power generating element is performed on a storage element on a load side including monitoring a voltage of the storage element, and when a voltage of a terminal of the storage element during opening reaches or exceeds a full charge voltage, or when the difference between the charge voltage of the storage element before opening and the voltage during opening of the terminal of the storage element reaches or is below a given value, performing charge control to stop charging, and controlling such that full charge with the terminal of the storage element open is not detected until the voltage of the storage element reaches the full charge voltage.

According to a fourth embodiment of the present disclosure, there is provided a feed system, including a power generating element that generates power, a storage element that stores power generated in the power generating element, and a power control device that supplies power of the power generating element to the storage element, wherein the power control device includes a control unit that performs charge control of power generated in the power generating element on the storage element on a load side, and wherein the control unit monitors a voltage of the storage element, and when a voltage of a terminal of the storage element during opening reaches or exceeds a full charge voltage, or when the difference between the charge voltage of the storage element before opening and the voltage during opening of the terminal of the storage element reaches or is below a given value, performs charge control to stop charging; and controls such that full charge with the terminal of the storage element open is not detected until the voltage of the storage element reaches the full charge voltage.

Advantageous Effects of Invention

According to the present disclosure, a power generating element such as a solar battery can be controlled to maintain a maximum power point, and power losses can be avoided.

Additional features and advantages are described herein, and will be apparent from the following Detailed Description and the figures.

BRIEF DESCRIPTION OF THE FIGURES

FIG. 19 is a diagram for describing an operation of the step-up switching regulator of FIG. 17.

DETAILED DESCRIPTION

Hereinafter, an embodiment of the present disclosure will be described in association with drawings. 1. Overall configuration of a feed system, 2. Configuration example of a power generating element, 3. Configuration example of a storage element, 4. Configuration example of a power control device, and 5. When solar batteries of different types are used.

<1. Overall Configuration of a Feed System>

Figure 1:
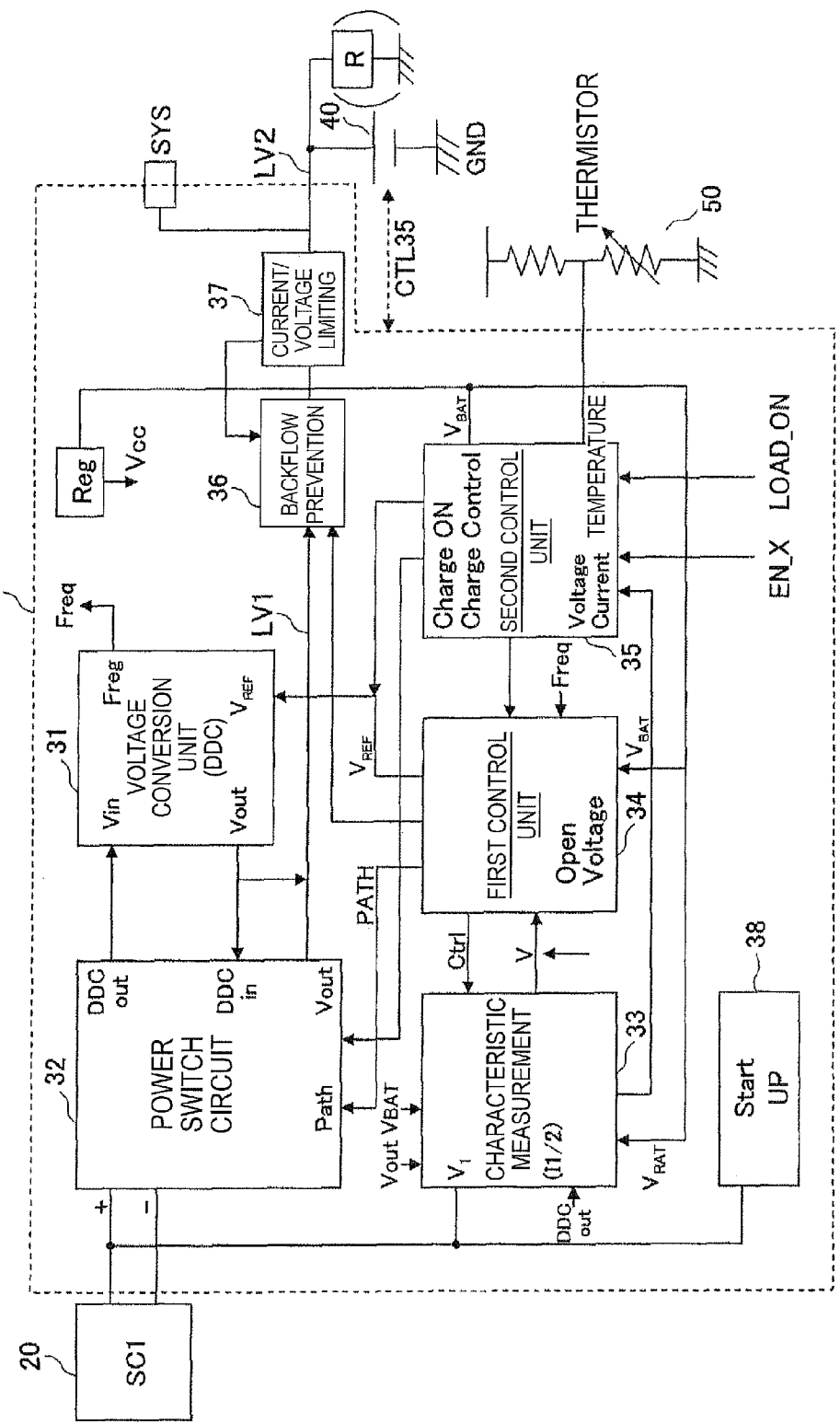
FIG. 1 is a diagram showing an example of an overall configuration of a feed system according to an embodiment of the present disclosure.

FIG. 1 is a diagram showing an example of an overall configuration of a feed system according to an embodiment of the present disclosure.

The present feed system 10 includes a power generating element 20, a power control device 30, and a storage element 40 as main constituent elements.

In addition, the feed system 10 includes a thermistor 50 connected to the power control device 30.

The present feed system 10 is configured to be able to charge (store) power from the power generating element 20 of a solar battery, or the like in the storage element (battery) 40 that is a secondary battery not only under sunlight but also under an ordinary environment including in a shady area, under indirect light, in a bright interior, and the like.

In particular, the power control device 30 is formed as a charge control LSI that uses power generated from the power generating element 20 in charging without waste.

The power control device 30 can be connected to a Li-type secondary battery (including a polymer) as the storage element 40 so as to be able to perform charging.

The power control device 30 can be connected to one or a plurality of power generating elements 20. In the present embodiment, an example in which one power generating element 20 is connected thereto is shown.

In the present embodiment, the power control device 30 can use cells in an arbitrary number of series connections including a single cell.

The power control device 30 can use various kinds of power generating elements 20, and can be controlled so as to obtain maximum efficiency without depending on power-current characteristics of the power generating element 20.

The power control device 30 can perform charging with high efficiency by performing MPPT control to track the maximum power point of the power generating element (solar battery) 20. The power control device 30 enables MPPT control in the power generating element 20 of a single cell as well.

The power control device 30 enables charge control of the storage element 40 and power control of a solar battery.

The power control device 30 employs charge control of a storage battery in which full charge can be detected by comparing a terminal open voltage of the storage element to a threshold voltage.

In addition, the power control device 30 monitors the voltage of the storage element 40, can perform charge control to stop charging when the voltage at the time of terminal opening of the storage battery reaches or exceeds a full-charge voltage, and controls so that a terminal opening time interval of the storage element is shortened as the voltage of the storage battery becomes higher. In addition, in the case of charging from a power source in which an output of the power generating element 20 of a solar battery, or the like fluctuates to the storage element 40, the power control device 30 controls so that an opening time interval is shortened as the output of the power source becomes greater.

In addition, when the voltage during opening of a terminal of the storage element reaches or exceeds the full charge voltage, and charge control to stop charging is performed, the power control device 30 controls not to detect full charge with the terminal of the battery open until the voltage at the time of charging reaches or exceeds the full charge voltage without opening the terminal of the storage battery.

Accordingly, the power control device 30 can reduce charge losses at the time of detecting full charge and prevent overcharge during charging of the storage element 40.

The power control device 30 enables switching control to perform step-up or step-down by giving an input to the voltage conversion unit such as a step-up or step-down DC-DC converter, or the like, or to directly couple with the voltage conversion unit after disconnection.

When the voltage conversion unit is formed as a step-up DC-DC converter, the power control device 30 performs switching control on an output of the power generating element 20 to charge the storage battery passing through the voltage conversion unit (step-up circuit) or, to charge the storage element not to pass through the voltage conversion unit or without activation of the voltage conversion unit.

At this time, the power control device 30 obtains an open voltage Voc of the power generating element 20 of a solar battery, or the like, and a maximum power point voltage Vpm, and sets a voltage therebetween to be a switching point.

When the voltage conversion unit is formed as a step-down DC-DC converter, the power control device 30 performs switching control on an output of the power generating element 20 to charge the storage battery passing through the voltage conversion unit (step-down circuit) or, to charge the storage element not to pass through the voltage conversion unit or without activation of the voltage conversion unit.

At this time, the power control device 30 obtains a maximum power point voltage Vpm of the power generating element 20 of a solar battery, or the like, and sets a voltage lower than or equal to the maximum power point voltage Vpm to be a switching point.

Accordingly, the power control device 30 obtains charging power with high power generating efficiency in a simple circuit configuration during charging from the power generating element 20 of a solar battery, or the like.

The power control device 30 can control the start and the end (full charge) of charge of the storage element 40.

The power control device 30 has a function of stopping charging when, for example, a fixed or a variable charge end voltage is reached.

The power control device 30 has a function of starting charging when a fixed or a variable charge start voltage is reached, for example, after charging is stopped.

The power control device 30 can control a maximum charge current at the time of high illuminance using, for example, an external current control resistor. A threshold value of current control in this case can be set by externally attaching a resistor that measures a charge current flowing in the storage element 40.

The power control device 30 has a function of reducing a loss in a forward voltage VF while preventing backflow using bypass control of a backflow prevention diode from the storage element 40 to the power generating element 20.

The power control device 30 has a function of outputting power of the power generating element 20 from a load driving terminal after detection of full charge in which the fact that an open voltage of the storage element 40 has reached a given value is detected.

The power control device 30 can perform initial charge until a voltage returns when the voltage of the storage element 40 is in an over-discharge state being lower than or equal to a predetermined voltage, for example, lower than or equal to 2.7 V, or the like. In this case, the power control device 30 can perform charge by lowering (limiting) a current using, for example, an external current limiting resistor.

The power control device 30 has a function of preventing charging at a temperature lower than or equal to 0° C., or equal to higher than 60° C. using, for example, a thermistor that is externally connected.

The power control device 30 can control stop of charging and transition to a sleep mode using, for example, an external enable terminal.

In addition, the power control device 30 can also be configured to output output power information.

Hereinafter, examples of specific configurations and functions of each unit will be described.

Hereinbelow, after configurations and functions of the power generating element 20 and the storage element 40 are described, a specific configuration and function of the power control device 30 will be described in detail.

<2. Configuration Example of the Power Generating Element>

The power generating element 20 has a function of generating power from natural energy such as sunlight and wind, and supplies the generated power to the power control device 30.

In the present embodiment, as the power generating element 20, a photovoltaic panel, for example, a solar battery that uses photo-electric conversion of sunlight, is employed.

Figure 2:
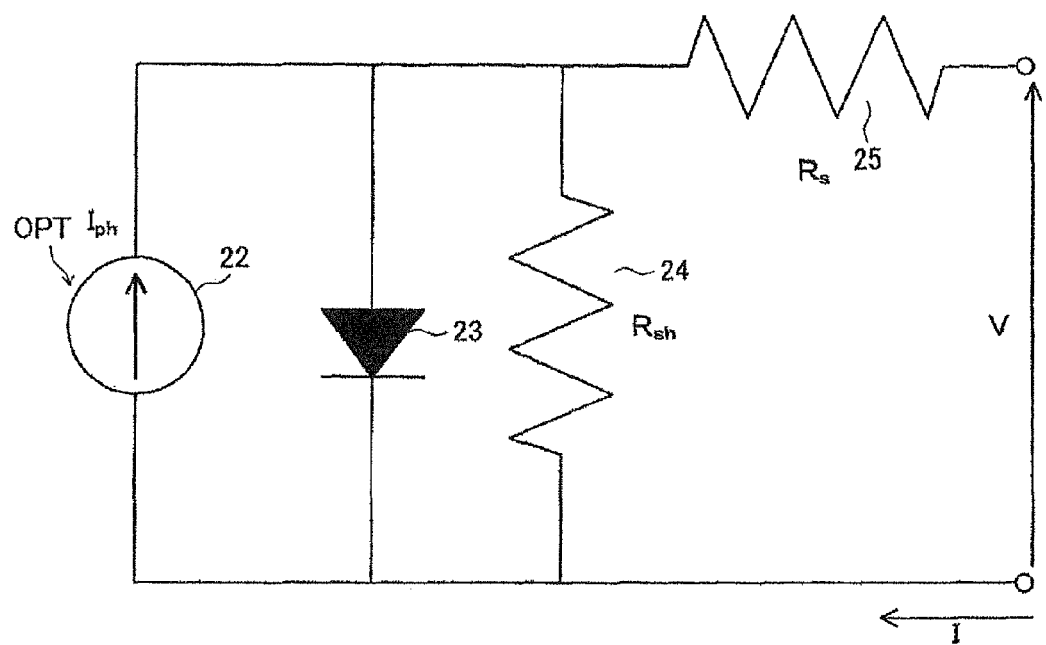
FIG. 2 is a diagram showing an equivalent circuit of a photovoltaic panel as a power generating element according to the embodiment of the present disclosure.

FIG. 2 is a diagram showing an equivalent circuit of a photovoltaic panel as the power generating element according to the embodiment.

The photovoltaic panel (solar battery) 21 generates a current with an optical input as shown in the equivalent circuit of FIG. 2.

FIG. 2 expresses a current Ish obtained by substituting an optical input OPT with an electromotive force (Iph).

Further, in FIG. 2, the sum of resistors of a board, a light sensing layer, and an electrode unit of the solar battery 21 is indicated by a series resistor Rs, and a loss resistor of the solar battery 21 is indicated by Rsh.

In FIG. 2, an output current of the solar battery 21 is indicated by Id, and an output voltage thereof is indicated by V.

In the solar battery 21, a current increases when an amount of incident light is large (bright), and a current decreases when an amount of incident light is small (dark). In the equivalent circuit of FIG. 2, brightness of light is expressed by the magnitude of a current source. When the voltage becomes high, the current slowly decreases.

This equivalent circuit is configured to connect the current source 22, a diode 23, and a resistor 24 in parallel, and to further connect a resistor 25 in series.

The current source 22 supplies a photo-current $I_{ph}$, and the diode 23 is an ideal diode. When a voltage V between terminals of the solar battery 21 is increased, the current $I_{ph}$ from the current source 22 flows to the diode 23, and thus the current I flowing on a terminal side decreases as the voltage V increases.

Figure 3:
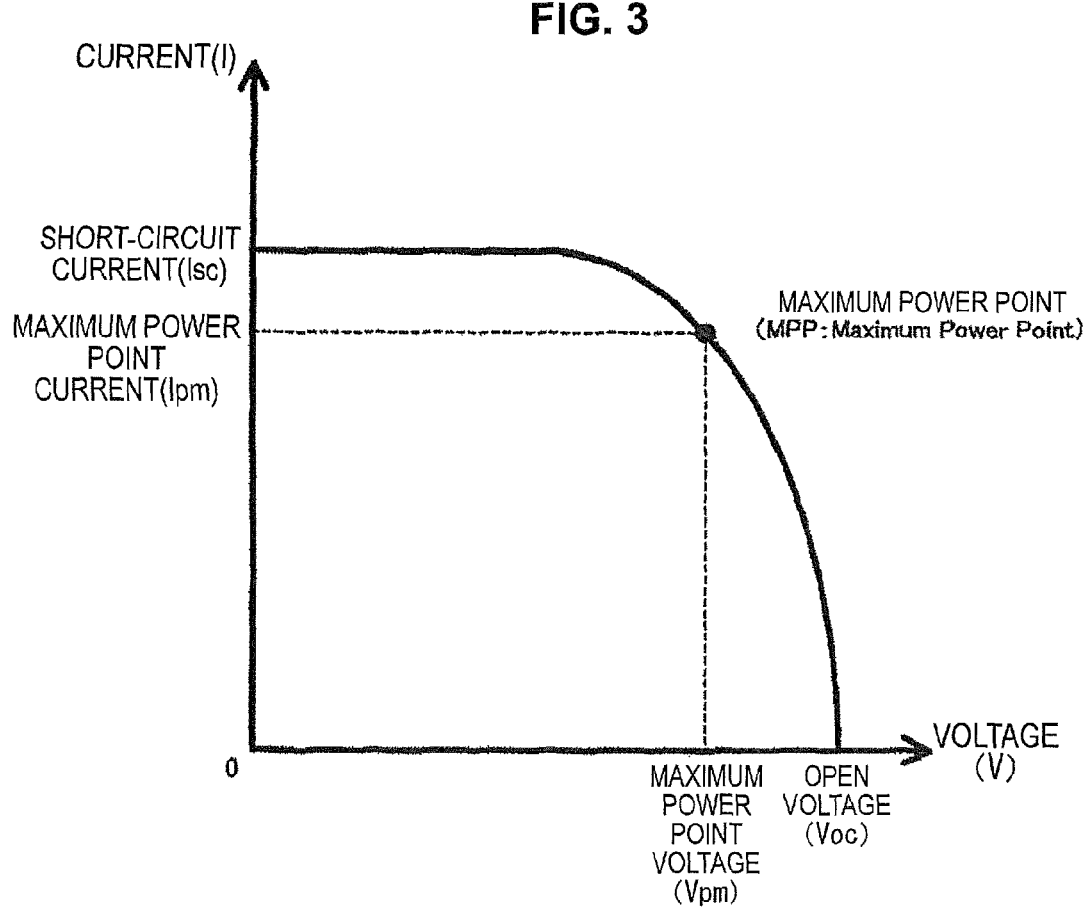
FIG. 3 is a diagram showing current-voltage characteristics of a general solar battery.

FIG. 3 is a diagram showing current-voltage characteristics of a general solar battery.

When a voltage value between terminals is decided in the solar battery 21, an output current value is uniformly decided.

A voltage between the terminals when the current value is 0 is called an open voltage (Voc), and an output current value when a voltage value between the terminals is 0 is called a short-circuit current (Isc).

As described above, in the curve showing the current-voltage characteristics of the solar battery, there is only one maximum power point at which power (=a voltage×a current) is maximized.

The current at this maximum power point is called a maximum power point current (Ipm), and the voltage at the maximum power point is called a maximum power point voltage (Vpm).

Due to the characteristics of the solar battery described above, when a maximum output from a solar battery is to be obtained, it is necessary to make a voltage of a load connected to the solar battery coincide with the maximum power point voltage of the solar battery.

Since the current-voltage characteristics of the solar battery change depending on environmental factors such as illuminance, temperature, or the like, it is necessary to perform control to obtain a maximum power point voltage at the time of an operation of a solar battery-connected device.

In the present embodiment, in the power control device 30, switching control on an output of the power generating element 20 to charge the storage element passing through the voltage conversion unit that is a DC-DC converter or, to charge the storage element not to pass through the voltage conversion unit or without activation of the voltage conversion unit is performed.

At this time, the power control device 30 obtains an open voltage Voc and a maximum power point voltage Vpm of the power generating element 20 of the solar battery, or the like and sets a voltage therebetween to be a switching point in the case of a step-up DC-DC converter. In the case of a step-down DC-DC converter, the power control device obtains the maximum power point voltage Vpm of the power generating element 20 of the solar battery, or the like, and sets a voltage lower than or equal to the maximum power point voltage Vpm to be a switching point.

In addition, in the present embodiment, in the power control device 30, the voltage of the storage element 40 is monitored, and when the voltage at the time of opening a terminal of the storage battery reaches or exceeds the full charge voltage, charge control to stop charging is performed, and the terminal opening time interval of the storage element is controlled to be shortened as the voltage of the storage element becomes higher. In addition, in the power control device 30, in the case of charging from the power source in which the output of the power generating element 20 of the solar battery or the like fluctuates to the storage element 40, the opening time interval is controlled to be shortened as the output of the power source becomes higher.

In addition, in the power control device 30, when charge control is performed, it is controlled not to detect full charge with the terminal of the battery open until the voltage at the time of charging reaches or exceeds the full charge voltage without opening the terminal of the storage battery.

Power obtained in the solar battery 21 is a direct current, and this direct current power (DC power) is supplied to the power control device 30.

<3. Configuration Example of the Storage Element>

The storage element 40 stores power supplied from the power control device 30.

The storage element 40 can employ an element, for example, an electrical double-layer capacitor, a lithium-ion secondary battery, or the like of which a charge voltage changes.

Figure 4:
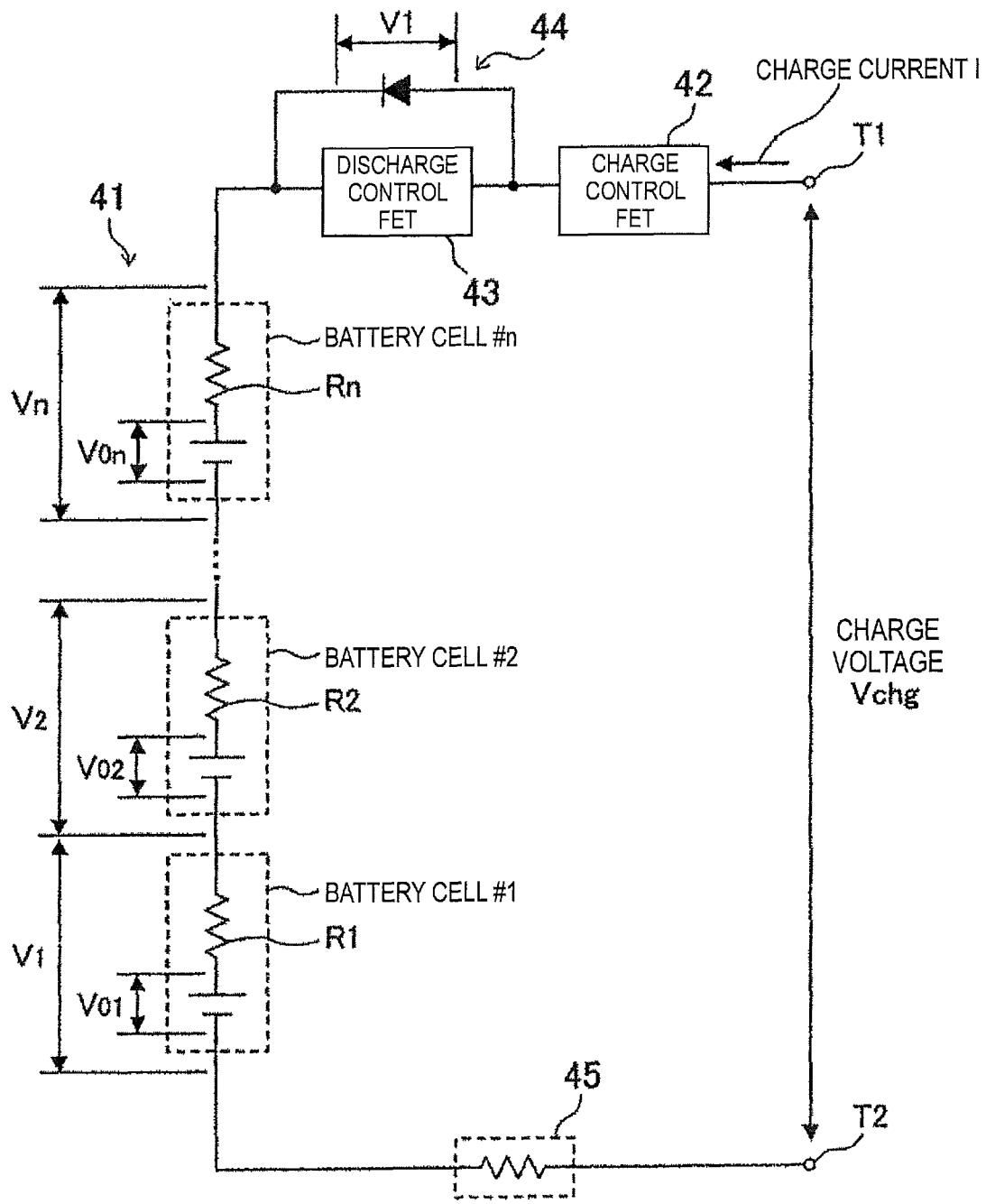
FIG. 4 is a diagram showing a configuration example of a storage element according to the embodiment of the present disclosure.

FIG. 4 is a diagram showing a configuration example of the storage element according to the embodiment.

The storage element 40 of FIG. 4 includes an assembled battery 41, a charge control field effect transistor (FET: Field Effect Transistor) 42, a discharge control FET 43, a diode 44, and a current detection resistor 45.

In the storage element 40, a positive terminal T1 and a negative terminal T2 are connected to a positive terminal and a negative terminal of an electronic device that is a load.

In the storage element 40, charge and discharge are performed for the assembled battery 41 via the charge control FET 42, the discharge control FET 43, the diode 44, and the current detection resistor 45 under control of the power control device 30.

The assembled battery 41 is a secondary battery such as a lithium-ion secondary battery, and is an assembled battery in which a plurality of battery cells are connected in series and/or in parallel.

In the example of FIG. 4, a case in which three battery cells are connected in series is shown.

In the present embodiment, the power control device 30 controls to prevent overcharge or over-discharge of the storage element 40, or controls so as to attain safe charge during charging.

In the storage element 40, voltages of the assembled battery 41 and each battery cell in the assembled battery 41 are measured every predetermined time, and the magnitude and the direction of a current flowing in the current detection resistor 45 are measured every predetermined time.

In the storage element 40, when the voltage of any cell of the assembled battery 41 reaches the overcharge detection voltage based on the measured voltage value and current value, the charge control FET 42 is controlled to be turned off.

In the storage element 40, when the voltage of the assembled battery 41 becomes the over-discharge detection voltage or lower, the discharge control FET 43 is controlled to be turned off so as to prevent overcharge or over-discharge.

Herein, in the case of a lithium-ion battery, the overcharge detection voltage is set to be, for example, 4.2 V±0.5 V, and the over-discharge detection voltage is set to be 2.4 V±0.1 V.

As a charge scheme for the assembled battery 41, a CCCV (Constant Current Constant Voltage) charge scheme is generally used.

In the CCCV charge scheme, charging is performed with a constant current (CC charge) until the voltage of the assembled battery 41 reaches a predetermined voltage, and charging is performed with a constant voltage (CV charge) after the voltage of the assembled battery 41 reaches the predetermined voltage. Then, charging is completed at a time point at which the charge current converges on substantially 0 [A].

<4. Configuration Example of the Power Control Device>

The power control device 30 includes a voltage conversion unit 31, and a power switch circuit 32 as a power path switching unit included in a power path unit as shown in FIG. 1.

The power control device 30 includes, as main constituent elements, a characteristic measurement circuit 33, a first control unit 34, a second control unit 35, a backflow prevention circuit 36, a current voltage limiting circuit 37, and a start-up circuit 38.

The voltage conversion unit 31 has functions of generating power using the power generating element 20, and stepping a voltage supplied from the power switch circuit 32 up or down in a selective manner.

The voltage conversion unit 31 supplies the voltage obtained from step-up or step-down to the storage element 40 via, for example, the power switch circuit 32 and the backflow prevention circuit 36.

The voltage conversion unit 31 is configured to be, for example, a DC-DC converter.

A specific configuration of this voltage conversion unit 31 will be described later in detail.

[Configuration Example of the Power Switch Circuit]

The power switch circuit 32 has a function of deciding the connection relationship between the power generating element (solar battery) 20, the voltage conversion unit (step-up or step-down circuit) 31, and the storage element (secondary battery) 40 in accordance with the first control unit 34 or the second control unit 35.

In other words, the power switch circuit 32 functions as a power path switching unit.

The power switch circuit 32 according to the present embodiment performs switching control to connect the power generating element 20 to the voltage conversion unit 31 so that an output thereof is connected to the storage element 40 side or to connect the output of the power generating element 20 directly to the storage element 40 side in accordance with the first control unit 34 or the second control unit 35.

Figure 5:
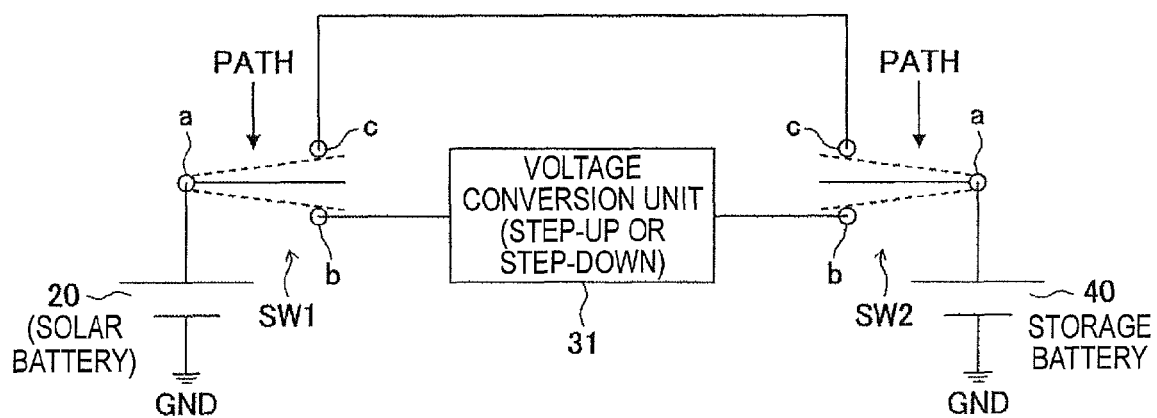
FIG. 5 is a diagram showing a configuration example of a power switch circuit according to an embodiment of the present disclosure.

FIG. 5 is a diagram showing a configuration example of the power switch circuit 32 according to an embodiment of the present disclosure.

The power switch circuit 32 of FIG. 5 is configured to include switches SW1 and SW2.

The switch SW1 causes a terminal a to be connected to a voltage output line of the power generating element (solar battery) 20, a terminal b to be connected to an input terminal of the voltage conversion unit 31, and a terminal c to be connected to another terminal c of the switch SW2.

The switch SW2 causes another terminal a to be connected to a voltage input line of the storage element (storage battery) 40, and another terminal b to be connected to an output line of a converted voltage of the voltage conversion unit 31.

When the switches SW1 and SW2 cause the terminal a to be connected to the terminal b when, for example, a high level of a path switching signal PATH by the first control unit 34 is received, and causes the terminal a to be connected to the terminal c when a low level of the signal is received.

In this manner, when a high level of the path switching signal PATH is received, the power switch circuit 32 connects the power generating element 20 to the voltage conversion unit 31 so as to form a path in which an output thereof is connected to the storage element 40 side.

When a low level of the path switching signal PATH is received, the power switch circuit 32 causes the voltage conversion unit 31 to be disconnected from the storage element 40 that is a load so as to form a path in which the power generating element 20 is directly connected to (directly coupled with) the storage element 40 side.

Next, the characteristic measurement circuit 33 of a power control circuit and control of a power path and the voltage conversion unit 31 by the first control unit 34 according to the measurement result will be described.

[Configuration Example of the Characteristic Measurement Circuit]

The characteristic measurement circuit 33 has a function of measuring a short-circuit current Ish and an open voltage Voc of the power generating element (SC1) 20.

The characteristic measurement circuit 33 measures current-voltage (I-V) for performing MPPT control in the voltage conversion unit 31 when a power path including the voltage conversion unit 31 including the step-up circuit and the step-down circuit is selected.

The first control unit 34 performs selection control of a power path of the power switch circuit 32 based on a measurement result of the characteristic measurement circuit 33.

When circuits are operated according to a selected power path, and a power path including the voltage conversion unit 31 including the step-up circuit and the step-down circuit is selected, the first control unit 34 performs MPPT control in the voltage conversion unit 31 based on, for example, an I-V measurement result.

[Control Method of the Characteristic Measurement Circuit]

In general, when charging with high energy efficiency is to be performed in charging using the power generating element (solar battery), a method in which MPPT control is performed so as to use the step-up circuit is used.

In the present embodiment, in order to charge with high energy efficiency, control is performed so that a circuit configuration of a solar battery charge circuit can be optimized by changing connection of one or a plurality of power generating elements (solar batteries) or the (step-up or step-down) circuit of the voltage conversion unit in accordance with a determination result.

In order to realize a circuit configuration that is optimum for the power switch circuit 32, optimum control for the power switch circuit 32 is performed based on a measurement result of the characteristic measurement circuit 33.

The characteristic measurement circuit 33 measures the open voltage Voc and the short-circuit current Ish of the power generating element (SC1) 20 in order to obtain information for selecting a power path.

The characteristic measurement circuit 33 supplies the measurement result to the first control unit 34.

The characteristic measurement circuit 33 measures a voltage VC1 of the power generating element (SC1) 20 for MPPT control.

The characteristic measurement circuit 33 supplies the measurement result to the first control unit 34 and the second control unit 35. In this case, information of a resistance value R is included. Based on V/R, a current I at the time of operation is obtained.

Note that, when the intent to stop a charge process by the second control unit 35 is notified of, the first control unit 34 controls so that all of the switches of the power switch circuit 32 are open and connection between the output of the power generating element 20 and a voltage supply line LV1 is blocked.

[Specific Configuration Example of the Characteristic Measurement Circuit]

Figure 6:
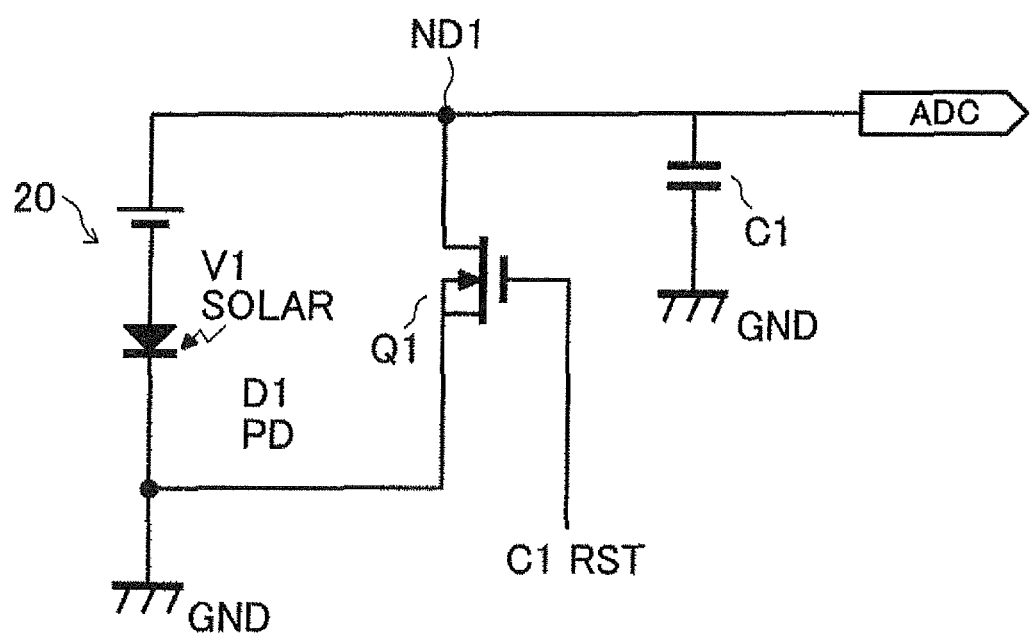
FIG. 6 is a circuit diagram showing a first configuration example of a characteristic measurement circuit according to the embodiment of the present disclosure.

FIG. 6 is a circuit diagram showing a configuration example of the characteristic measurement circuit according to the embodiment.

It is necessary to measure fine changes in a current and a voltage to ascertain operation characteristics of the power generating element of how much current and voltage the power generating element (solar battery) 20 generates in accordance with states of light each time.

Hitherto, a method of amplifying changes in a current and a voltage by connecting an amplifier, or the like was general.

In the present example, as a means for examining how much current and voltage the power generating element (solar battery) 20 generates, measurement using a capacitor C1 is performed.

In the present example, the capacitor C1 is connected to the power generating element (solar battery) 20 in series as shown in FIG. 6.

In addition, in a characteristic measurement circuit 33A of FIG. 6, a switching transistor Q1 is connected between a connection node ND1 and a reference potential VSS to reset the capacitor C1.

The switching transistor Q1 is formed of an NMOSFET, and a reset signal RST is selectively supplied to gates.

By measuring a charge voltage to the capacitor C1 at a fixed time interval, the I-V characteristics under the current environment can be measured.

$$V=Q/C, Q=\int i(t)dt \quad \text{[Math. 1]}$$

In this characteristic measurement circuit 33A, an MPP can be sought without using a P-V characteristic of a simple convex shape, and control can be performed using a voltage regulating method without performing a so-called mountain-climbing process.

Particularly, this is effective when MPP estimation using open voltages is not sufficient.

In addition, if a capacitor of the step-up circuit of the voltage conversion unit 31 can be utilized, measurement can be performed without extra components.

[Switching Control of the Power Switch Circuit 32 by the First Control Unit 34]

Herein, direct coupling switching control of the power switch circuit 32 by the first control unit 34 when the voltage conversion unit 31 is a step-up DC-DC converter and a step-down DC-DC converter will be described.

[Step-Up Direct Coupling Switching Control]

First, step-up direct coupling switching control by the first control unit 34 when the voltage conversion unit 31 is a step-up DC-DC converter will be described.

As described in association with FIG. 5, the power control device 30 of the present embodiment configures a circuit in which the storage element (storage battery) 40 is basically charged from the feed element (solar battery) 20 through the voltage conversion unit 31 of the step-up system.

In addition, the first control unit 34 and the power switch circuit 32 perform switching control so that the power generating element 20 is connected to the voltage conversion unit 31 so as to connect an output thereof to the storage element 40 side, or the output of the power generating element 20 is directly connected to the storage element 40 side.

Figure 7:
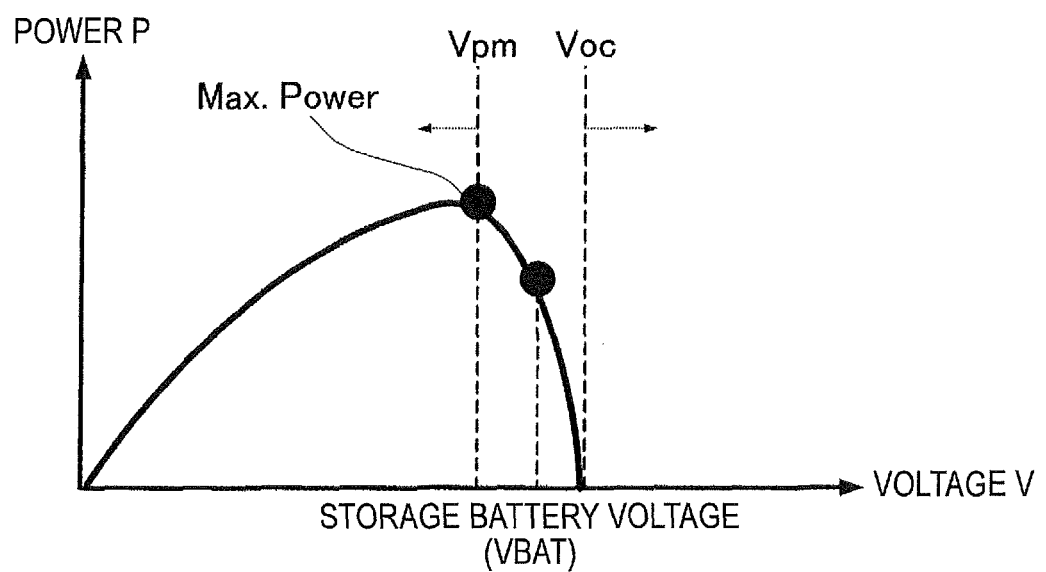
FIG. 7 is a diagram showing power-voltage characteristics of a solar battery for describing the concept of step-up direct coupling switching control according to the embodiment of the present disclosure.

FIG. 7 is a diagram showing power-voltage characteristics of a solar battery for describing the concept of step-up direct coupling switching control according to the embodiment.

The first control unit 34 compares a voltage $V_{BAT}$ of the storage element (storage battery) 40 to a maximum power point voltage Vpm of the power generating element (solar battery) 20 and an open voltage Voc of the power generating element (solar battery) 20, and sets a voltage satisfying Vpm≤$V_{BAT}$≤Voc to be a switching threshold value of step-up direct coupling switching control.

In other words, the first control unit 34 sets a voltage $V_{BAT}$ of the storage element 40 that is equal to or higher than the maximum power point voltage Vpm of the power generating element 20 and lower than or equal to the open voltage Voc of the power generating element 20 to be a switching threshold value.

For example, the first control unit 34 sets VBAT>(Vpm+Voc)/2 to be a threshold value.

In other words, as an example, the first control unit 34 sets a voltage Vddc_start for determining whether the voltage $V_{BAT}$ of the storage element 40 is greater than the average of the maximum power point voltage Vpm of the power generating element 20 and the open voltage Voc of the power generating element 20 to be a switching threshold value.

When the voltage $V_{BAT}$ of the storage element 40 is lower than or equal to the maximum power point voltage Vpm of the power generating element 20, the first control unit 34 determines that step-up is not necessary.

In addition, when voltage $V_{BAT}$ of the storage element 40 is equal to or higher than the open voltage Voc of the power generating element 20, the first control unit 34 determines that step-up is necessary.

Thus, by setting the switching threshold value in a portion therebetween, a drastic reduction in power generating efficiency can be avoided.

In the present embodiment, in the characteristic measurement circuit 33, the open voltage Voc is periodically measured so as to determine whether the power generating element 20 is to be connected to the voltage conversion unit 31 of the step-down system or directly coupled with the storage element 40.

The maximum power point voltage Vpm used in this determination can be obtained by resistor division by multiplying the measured open voltage by a predetermined coefficient Coef, for example, 0.8.

Figure 8:
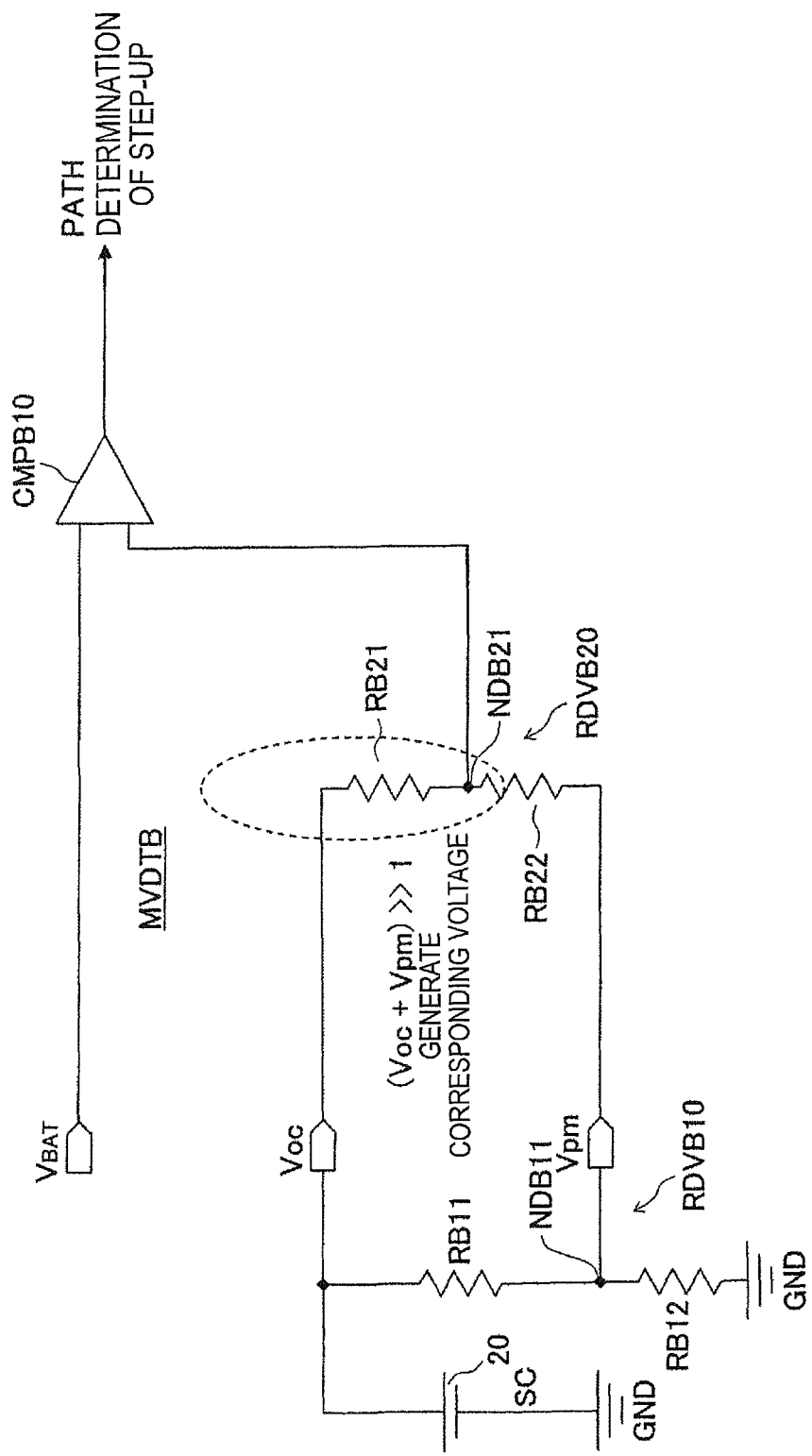
FIG. 8 is a circuit diagram showing a detection system of a maximum power point voltage of a power generating element in the case of a voltage conversion unit of a step-up system according to the embodiment of the present disclosure.

FIG. 8 is a circuit diagram showing a detection system of a maximum power point voltage of the power generating element in the case of the voltage conversion unit of the step-up system according to the embodiment.

A detection system MVDTB of the maximum power point voltage of FIG. 8 is configured to include resistor division units RDVB10 and RDVB20, and a comparator CMPB10.

In the detection system MVDTB, for example, the resistor division units RDVB10 and RDVB20 are disposed in the characteristic measurement circuit 33, and the comparator CMPB10 is disposed in the first control unit 34.

Alternatively, it can also be configured with the entire detection system MVDTB disposed in the characteristic measurement circuit 33 so as to notify the first control unit 34 of a determination result of the comparator CMPB10.

The resistor division unit RDVB10 is configured such that resistor elements RB11 and RB12 between the voltage output line of the power generating element 20 and a reference potential (herein, a ground potential) GND are connected in series, and a voltage that has undergone resistor division in a connection node NDB11 thereof is expressed as the maximum power point voltage Vpm.

The resistor division unit RDVB20 is configured such that resistor elements RB21 and RB22 are connected in series between a supply line of the measured open voltage Voc and a supply line of the maximum power point voltage Vpm, and expressed as a threshold voltage $\{(Vpm+Voc)/2\}$ that has undergone resistor division in a connection node NDB21 thereof.

The comparator CMPB10 compares the voltage $V_{BAT}$ of the storage element 40 and the threshold voltage $\{(Vpm+Voc)/2\}$.

When the voltage $V_{BAT}$ is higher than the threshold voltage $\{(Vpm+Voc)/2\}$, the comparator CMPB10 outputs, for example, a high level of the path switching signal PATH to the power switch circuit 32 in need of step-up.

When the high level of the path switching signal PATH is received, the power switch circuit 32 causes the power generating element 20 to be connected to the voltage conversion unit 31 so as to form a path in which an output thereof is connected to the storage element 40 side.

When the voltage $V_{BAT}$ is lower than or equal to the threshold voltage $\{(Vpm+Voc)/2\}$, the comparator CMPB10 outputs a low level of the path switching signal PATH to the power switch circuit 32 not in need of step-up.

When the low level of the path switching signal PATH is received, the power switch circuit 32 causes the voltage conversion unit 31 to be disconnected from the storage element 40 that is a load so as to form a path in which the power generating element 20 is directly connected to (directly coupled with) the storage element 40 side.

Figure 9:
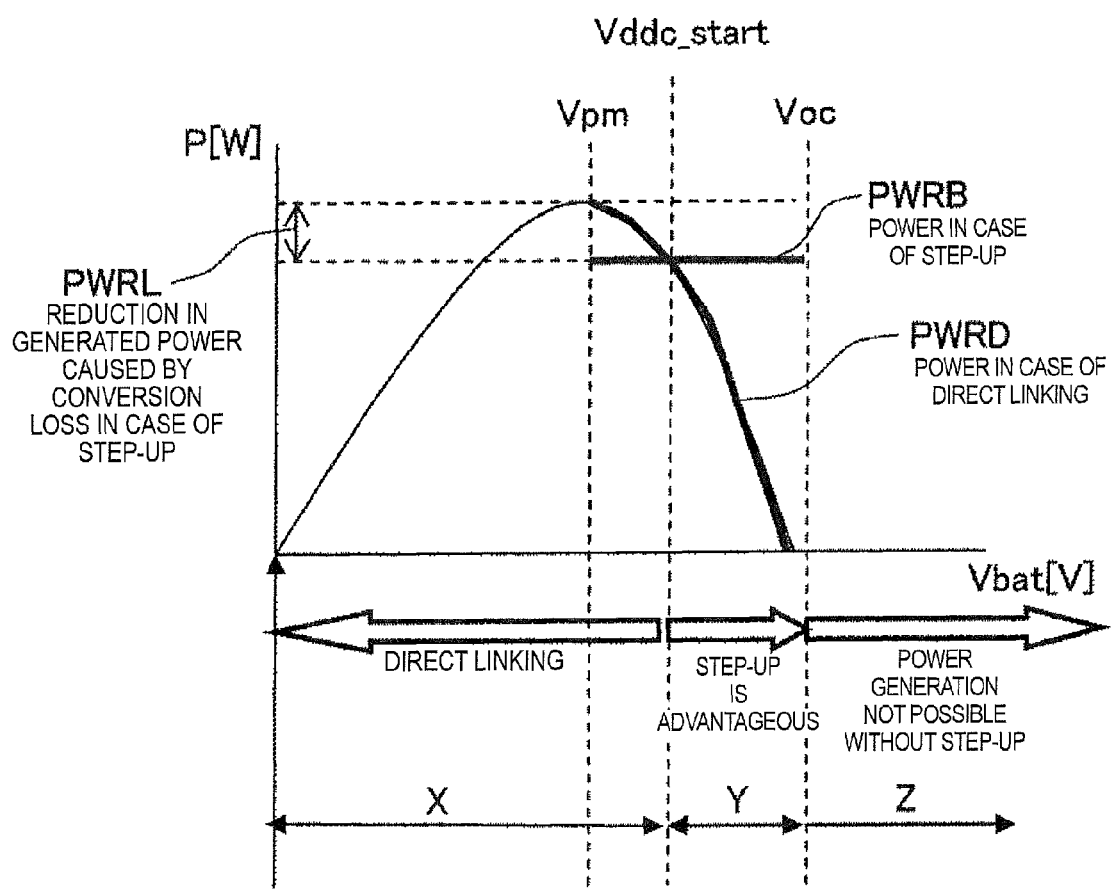
FIG. 9 is a diagram showing the concept of the step-up direct coupling switching control according to the embodiment of the present disclosure in more detail.

FIG. 9 is a diagram showing the concept of the step-up direct coupling switching control according to the embodiment in more detail.

As described above, the first control unit 34 sets a voltage that satisfies $Vpm \leq V_{BAT} \leq Voc$ to be a switching threshold value of step-up direct coupling switching control.

For example, the first control unit 34 sets a voltage Vddc_start for determining whether or not the voltage $V_{BAT}$ of the storage element 40 is greater than the average value of the maximum power point voltage Vpm of the power generating element 20 and the open voltage Voc of the power generating element 20 to be the switching threshold value.

In FIG. 9, PWRL indicates a reduced amount of generated power caused by conversion loss in the case of step-up. PWRB indicates power in the case of step-up, and PWRD indicates power in the case of direct coupling (direct linking).

In FIG. 9, the region indicated by the symbol X is a region in which the voltage $V_{BAT}$ of the storage element 40 is lower than or equal to the switching threshold voltage Vddc_start. In the region X, since the maximum power point voltage Vpm is included near the MPP, and the loss of a step-up amount is great. Thus, direct linking without step-up is advantageous in the region X. In this case, the path switching signal PATH is set to a low level.

The region indicated by symbol Y is a region where the voltage $V_{BAT}$ of the storage element 40 is equal to or higher than the switching threshold voltage Vddc_start and lower than or equal to the open voltage Voc.

In this region, step-up is basically advantageous. Herein, since there are cases in which a power generation output voltage by the power generating element 20 affects operations if the voltage is lower than or equal to a certain level of voltage, in the present embodiment, a minimum compensation threshold voltage Vddc_min is set for the power generation output voltage.

In addition, when the maximum power point voltage Vpm is lower than the minimum compensation threshold voltage Vddc_min (Vpm<Vddc_min), direct linking is implemented. This is because, since step-up is performed while the maximum power point voltage is small, a loss is great even when step-up is performed. In this case, the path switching signal PATH is set to a low level.

On the other hand, when Vpm≥Vddc_min, step-up is performed. In this case, the path switching signal PATH is set to a high level.

The region indicated by the symbol Z is a region in which power generation is basically impossible if step-up is not performed.

However, in the case of Vpm<Vddc_min, the circuit is open, and in the case of Vpm≥Vddc_min, step-up is performed. When step-up is performed, the path switching signal PATH is set to a high level.

Figure 10:
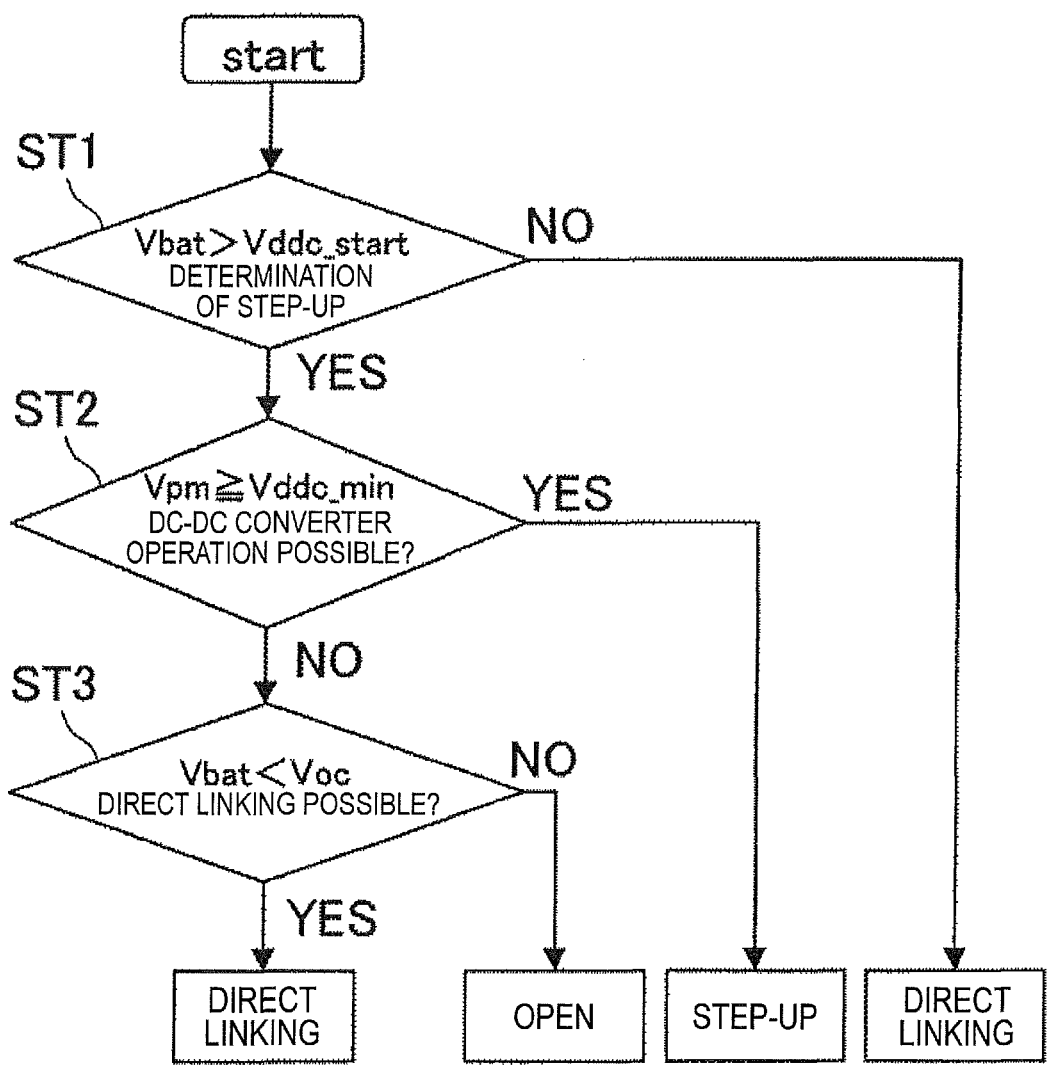
FIG. 10 is a flowchart showing a first example of a state determination process for determining whether a power generating element (solar battery) is to be connected to a step-up system or directly coupled with a storage element according to the embodiment of the present disclosure.

FIG. 10 is a flowchart showing a first example of a state determination process for determining whether the power generating element (solar battery) is to be connected to the step-up system or directly coupled with the storage element according to the embodiment.

First, the first control unit 34 determines whether or not the voltage VBAT of the storage element 40 is higher than the switching threshold voltage Vddc_start (ST1).

In Step ST1, when the voltage $V_{BAT}$ of the storage element 40 is determined to be lower than or equal to the switching threshold voltage Vddc_start, the first control unit 34 outputs a low level of the path switching signal PATH to the power switch circuit 32.

When the low level of the path switching signal PATH is received, the power switch circuit 32 causes the voltage conversion unit 31 to be disconnected from the storage element 40 that is a load so as to form a path in which the power generating element 20 is directly connected to (directly coupled with) the storage element 40 side.

In Step ST1, when the voltage VBAT of the storage element 40 is higher than the switching threshold voltage Vddc_start, the first control unit 34 determines whether or not the maximum power point voltage Vpm is equal to or higher than the minimum compensation threshold voltage Vddc_min (ST2).

In Step ST2, when the maximum power point voltage Vpm is determined to be equal to or higher than the minimum compensation threshold voltage Vddc_min, the first control unit 34 outputs a low level of the path switching signal PATH to the power switch circuit 32.

When the high level of the path switching signal PATH is received, the power switch circuit 32 causes the power generating element 20 to be connected to the voltage conversion unit 31 so as to form a path in which an output thereof is connected to the storage element 40 side.

In Step ST2, when the maximum power point voltage Vpm is determined to be lower than the minimum compensation threshold voltage Vddc_min, the first control unit 34 determines whether or not the voltage $V_{BAT}$ of the storage element 40 is lower than the open voltage Voc (ST3).

In Step ST3, when the maximum power point voltage Vpm is determined to be lower than the minimum compensation threshold voltage Vddc_min, a low level of the path switching signal PATH is output to the power switch circuit 32.

When the low level of the path switching signal PATH is received, the power switch circuit 32 causes the voltage conversion unit 31 to be disconnected from the storage element 40 so as to form a path in which the power generating element 20 is directly connected to (directly coupled with) the storage element 40 side.

In Step ST3, when maximum power point voltage Vpm is determined to be equal to or higher than the minimum compensation threshold voltage Vddc_min, a terminal is open. The location of the terminal to be open is, for example, a terminal Vout of the power switch circuit 33 in FIG. 1.

Figure 11:
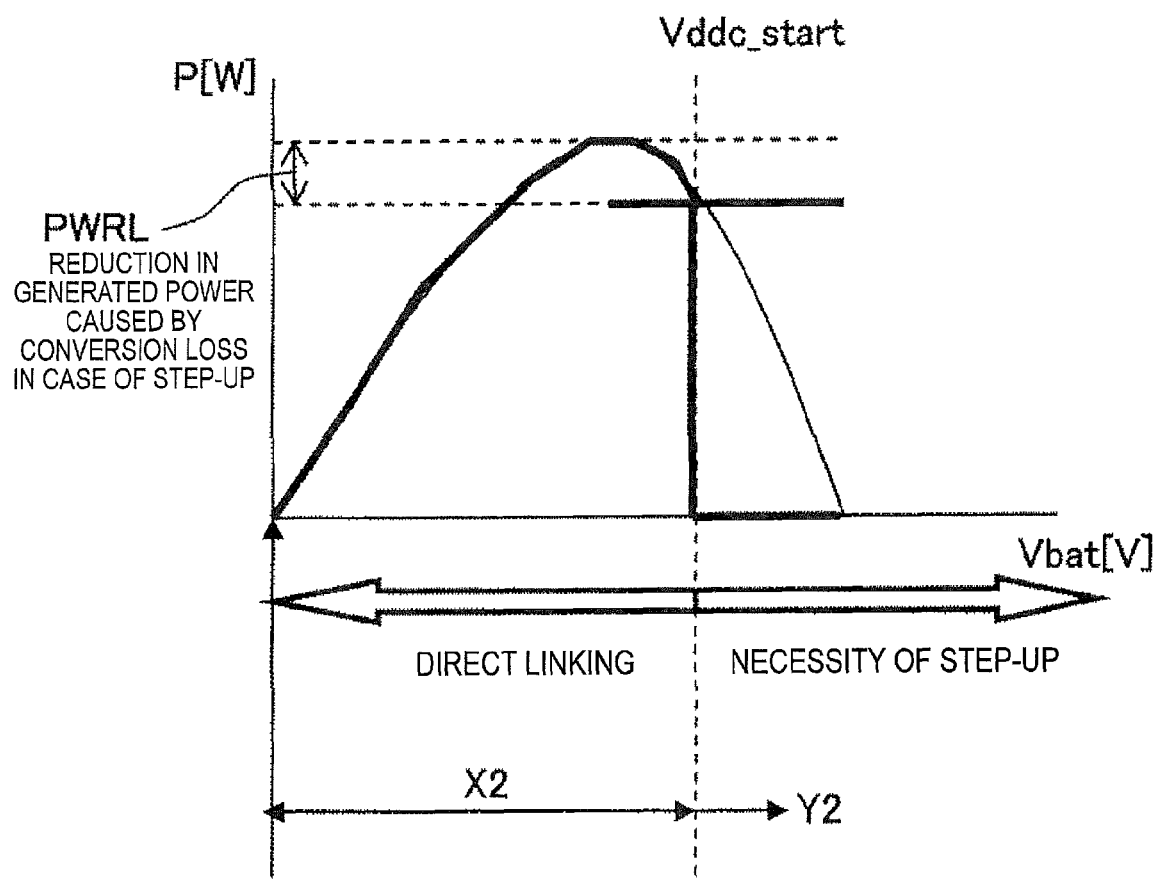
FIG. 11 is a diagram further briefly showing the concept of the step-up direct coupling switching control according to the embodiment of the present disclosure.

FIG. 11 is a diagram further briefly showing the concept of the step-up direct coupling switching control according to the embodiment.

The example of FIG. 11 further briefly shows the specific example of FIG. 9.

Also in this case, the first control unit 34 sets a voltage that satisfies Vpm≤$V_{BAT}$≤Voc to be a switching threshold value of step-up direct coupling switching control.

For example, the first control unit 34 sets a voltage Vddc_start for determining whether or not the voltage $V_{BAT}$ of the storage element 40 is greater than the average value of the maximum power point voltage Vpm of the power generating element 20 and the open voltage Voc of the power generating element 20 to be a switching threshold value.

In the example of FIG. 11, switching control of step-up direct coupling is performed only by dividing a region X in which the voltage is lower than the switching threshold voltage Vddc_start and a region Y in which the voltage is higher than the switching threshold voltage Vddc_start.

In FIG. 11, the region indicated by the symbol X2 is a region in which the voltage $V_{BAT}$ of the storage element 40 is lower than or equal to the switching threshold voltage Vddc_start. In this region X2, since the maximum power point voltage Vpm is included near the MPP, the loss of a step-up amount is great. Thus, direct linking without step-up is advantageous in this region X. In this case, the path switching signal PATH is set to a low level.

The region indicated by the symbol Y2 is a region in which the voltage $V_{BAT}$ of the storage element 40 is equal to or higher than the switching threshold voltage Vddc_start.

In this region, step-up is basically necessary.

However, when Vpm<Vddc_min, the circuit is open, and when Vpm≥Vddc_min, step-up is performed. When step-up is performed, the path switching signal PATH is set to a high level.

Figure 12:
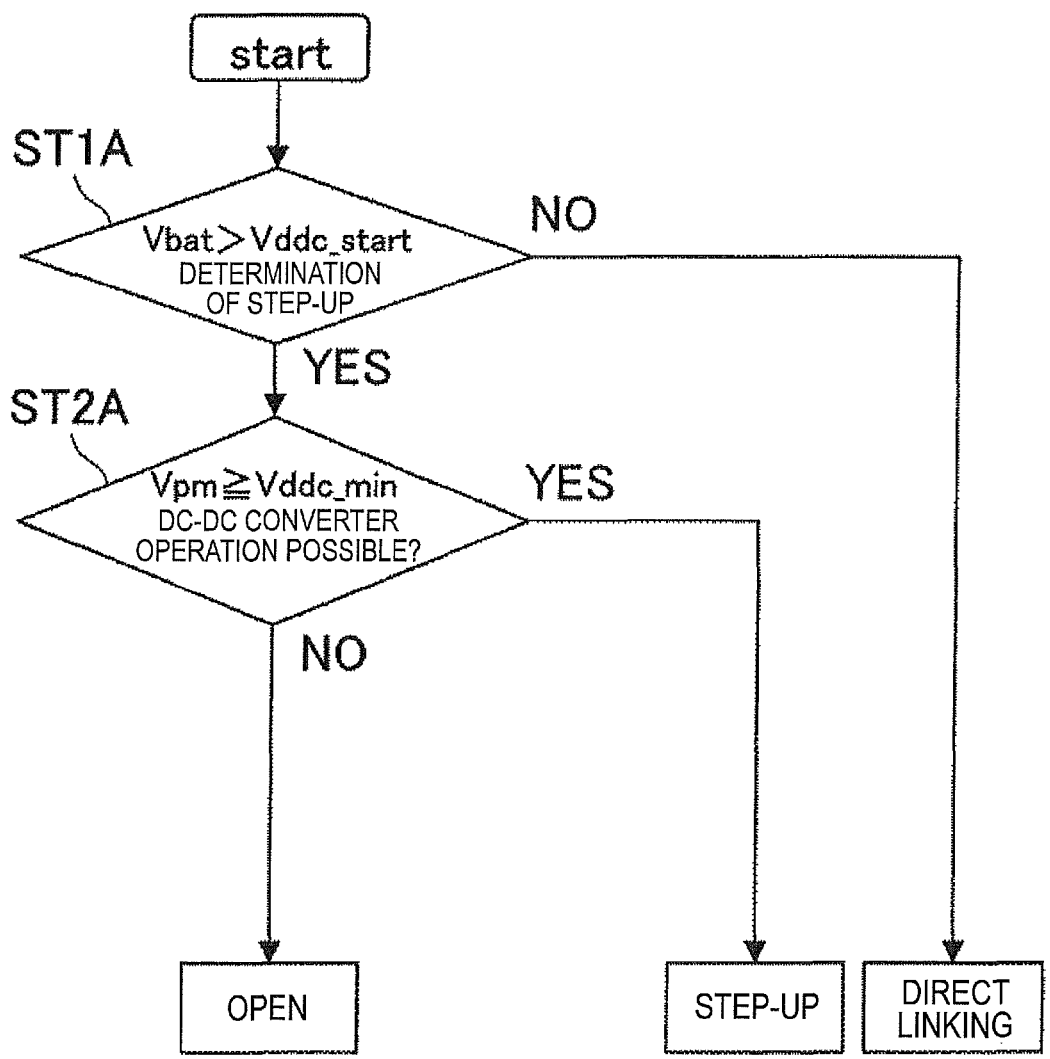
FIG. 12 is a flowchart showing a second example of the state determination process for determining whether the power generating element (solar battery) is to be connected to the step-up system or directly coupled with the storage element according to the embodiment of the present disclosure.

FIG. 12 is a flowchart showing a second example of the state determination process for determining whether the power generating element (a solar battery) is to be connected to the step-up system or directly coupled with the storage element according to the embodiment.

First, the first control unit 34 determines whether or not the voltage VBAT of the storage element 40 is higher than the switching threshold voltage Vddc_start (ST1A).

In Step ST1A, when the voltage VBAT of the storage element 40 is determined to be lower than or equal to the switching threshold voltage Vddc_start, the first control unit 34 outputs a low level of the path switching signal PATH to the power switch circuit 32.

When the low level of the path switching signal PATH is received, the power switch circuit 32 causes the voltage conversion unit 31 to be disconnected from the storage element 40 that is a load so as to form a path in which the power generating element 20 is directly connected to (directly coupled with) the storage element 40 side.

In Step ST1A, when the voltage VBAT of the storage element 40 is higher than the switching threshold voltage Vddc_start, the first control unit 34 determines whether the maximum power point voltage Vpm is equal to or higher than the minimum compensation threshold voltage Vddc_min (ST2A).

In Step ST2, when the maximum power point voltage Vpm is equal to or higher than the minimum compensation threshold voltage Vddc_min, the first control unit 34 outputs a low level of the path switching signal PATH to the power switch circuit 32.

When the high level of the path switching signal PATH is received, the power switch circuit 32 causes the power generating element 20 to be connected to the voltage conversion unit 31 so as to form a path in which an output thereof is connected to the storage element 40 side.

In Step ST2A, when the maximum power point voltage Vpm is lower than the minimum compensation threshold voltage Vddc_min, the first control unit 34 opens a terminal. The location of the terminal to be open is, for example, the terminal Vout of the power switch circuit 33 in FIG. 1.

As above, in the present embodiment, determination of performing or not performing step-up (direct coupling of the solar battery with the storage battery) can be attained with high accuracy using a simple circuit.

[Step-Down Direct Coupling Switching Control]

Next, step-up direct coupling switching control by the first control unit 34 when the voltage conversion unit 31 is a step-down DC-DC converter will be described.

As described in association with FIG. 5, the power control device 30 of the present embodiment configures a circuit in which the storage element (storage battery) 40 is basically charged from the feed element (solar battery) 20 through the voltage conversion unit 31 of a step-down system.

In addition, in the same manner as in the step-up system, the first control unit 34 and the power switch circuit 32 perform switching control so that the power generating element 20 is connected to the voltage conversion unit 31 so as to connect an output thereof to the storage element 40 side, or the output of the power generating element 20 is directly connected to the storage element 40 side.

Figure 13:
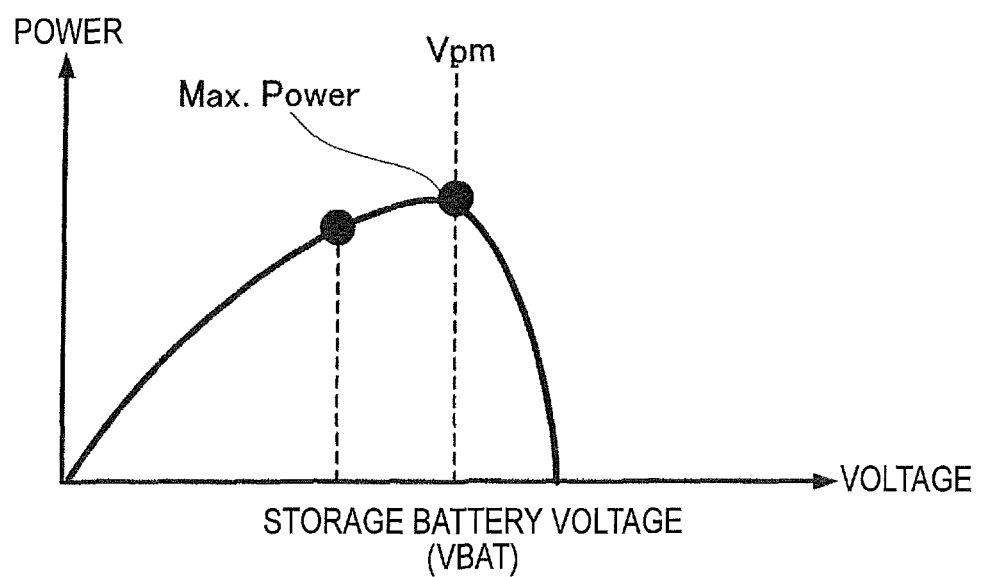
FIG. 13 is a diagram showing power-current characteristics of a solar battery for describing the concept of step-down direction coupling switching control according to the embodiment of the present disclosure.

FIG. 13 is a diagram showing power-current characteristics of the solar battery for describing the concept of step-down direction coupling switching control according to the embodiment.

The first control unit 34 compares the voltage $V_{BAT}$ of the storage element (storage battery) 40 to the maximum power point voltage Vpm of the power generating element (solar battery) 20 and a voltage that satisfies $V_{BAT}$≤Vpm to be a switching threshold value of step-down direct coupling switching control.

In other words, the first control unit 34 sets the voltage $V_{BAT}$ of the storage element 40 that is lower than or equal to the maximum power point voltage Vpm of the power generating element 20 to be the switching threshold value.

For example, the first control unit 34 sets $V_{BAT} \leq Vpm \times 0.9$ to be the threshold value.

In other words, as an example, the first control unit 34 sets a voltage Vddc_start for determining whether the voltage $V_{BAT}$ of the storage element 40 is lower than or equal to the voltage of 90% of the maximum power point voltage Vpm of the power generating element 20 to be the switching threshold value.

When the voltage $V_{BAT}$ of the storage element 40 is equal to or higher than the maximum power point voltage Vpm of the power generating element 20 ($V_{BAT} \geq Vpm$), the first control unit 34 determines that step-down is not necessary.

Thus, by setting the switching threshold value in other regions, a drastic reduction in power generation efficiency can be avoided.

In the present embodiment, in the characteristic measurement circuit 33, the open voltage Voc is periodically measured so as to determine whether the power generating element 20 is to be connected to the voltage conversion unit 31 of the step-down system or directly coupled with the storage element 40.

The maximum power point voltage Vpm used in this determination can be obtained by resistor division by multiplying the measured open voltage by a predetermined coefficient Coef, for example, 0.8.

Figure 14:
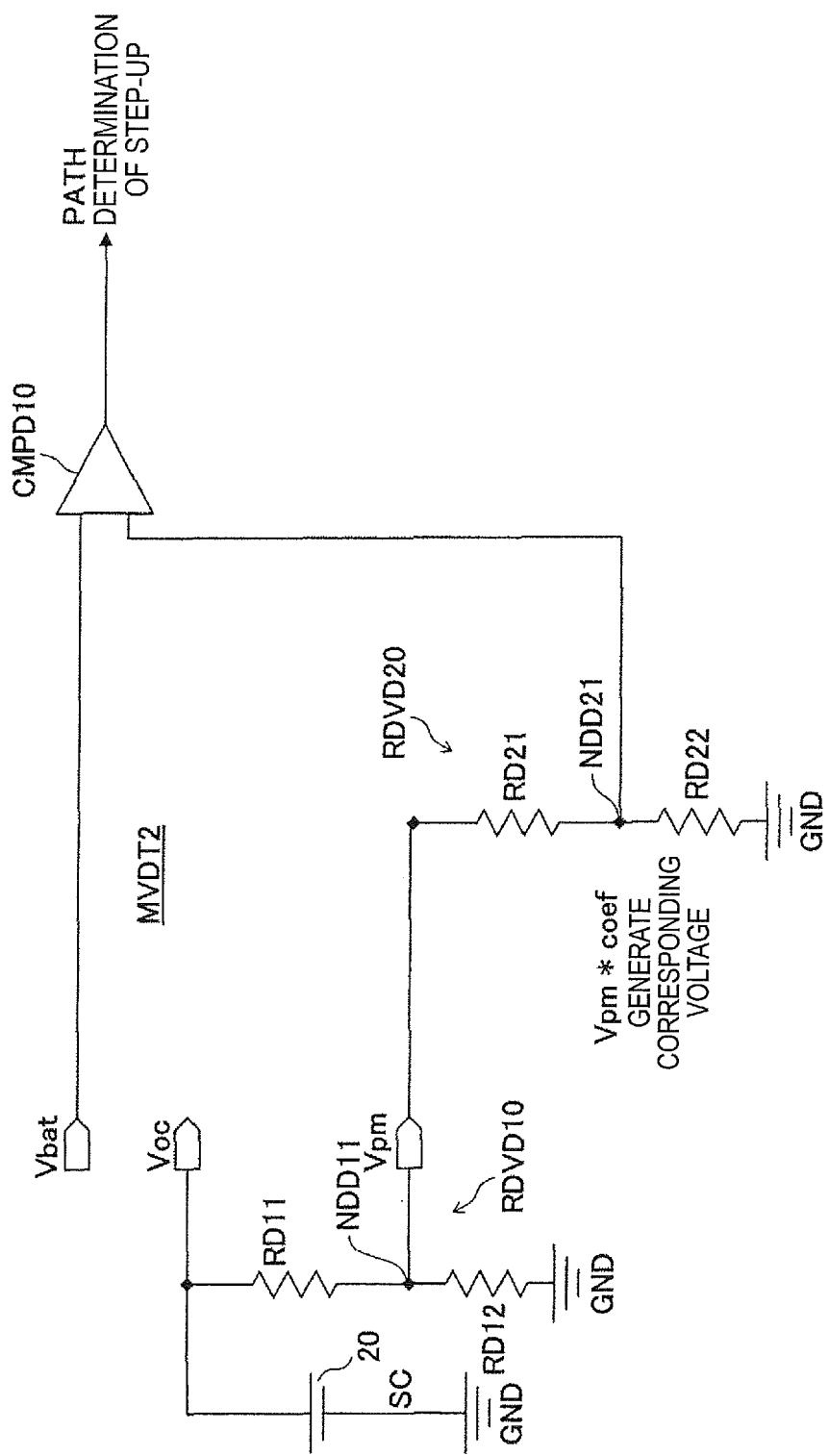
FIG. 14 is a circuit diagram showing a detection system of a maximum power point voltage of a power generating element in a case of a voltage conversion unit of a step-down system according to the embodiment of the present disclosure.

FIG. 14 is a circuit diagram showing a detection system of the maximum power point voltage of the power generating element in the case of a voltage conversion unit of a step-down system according to the embodiment.

The detection system MVDD of the maximum power point voltage of FIG. 14 is configured to include resistor division units RDVD10 and RDVD20 and a comparator CMPD10.

Of the detection system MVDD, for example, the resistor division units RDVD10 and RDVD20 are disposed in the characteristic measurement circuit 33, and the comparator CMPD10 is disposed in the first control unit 34.

Alternatively, it may also be configured with the entire detection system MVDTD disposed in the characteristic measurement circuit 33 so as to notify the first control unit 34 of a determination result of the comparator CMPD10.

The resistor division unit RDVD10 is configured such that resistor elements RD11 and RD12 between the voltage output line of the power generating element 20 and a reference potential (herein, a ground potential) GND are connected in series, and a voltage that has undergone resistor division in a connection node NDD11 thereof is expressed as the maximum power point voltage Vpm.

The resistor division unit RDVD20 is configured such that resistor elements RD21 and RD22 are connected in series between the supply line of the maximum power point voltage Vpm and the reference potential, and expressed as a threshold voltage Vddc_start that has undergone resistor division in a connection node NDD21 thereof.

The comparator CMPD10 compares the voltage $V_{BAT}$ of the storage element 40 to the threshold voltage Vddc_start.

When the voltage $V_{BAT}$ is lower than the threshold voltage Vddc_start, the comparator CMPD10 outputs, for example, a high level of the path switching signal PATH to the power switch circuit 32 in need of step-down.

When a high level of the path switching signal PATH is received, the power switch circuit 32 causes the power generating element 20 to be connected to the voltage conversion unit 31 so as to form a path in which an output thereof is connected to the storage element 40 side.

When the voltage $V_{BAT}$ is equal to or higher than the threshold voltage Vddc_start, the comparator CMPD10 outputs a low level of the path switching signal PATH to the power switch circuit 32 not in need of step-down.

When a low level of the path switching signal PATH is received, the power switch circuit 32 causes the voltage conversion unit 31 to be disconnected from the storage element 40 that is a load so as to form a path in which the power generating element 20 is directly connected to (directly coupled with) the storage element 40 side.

Figure 15:
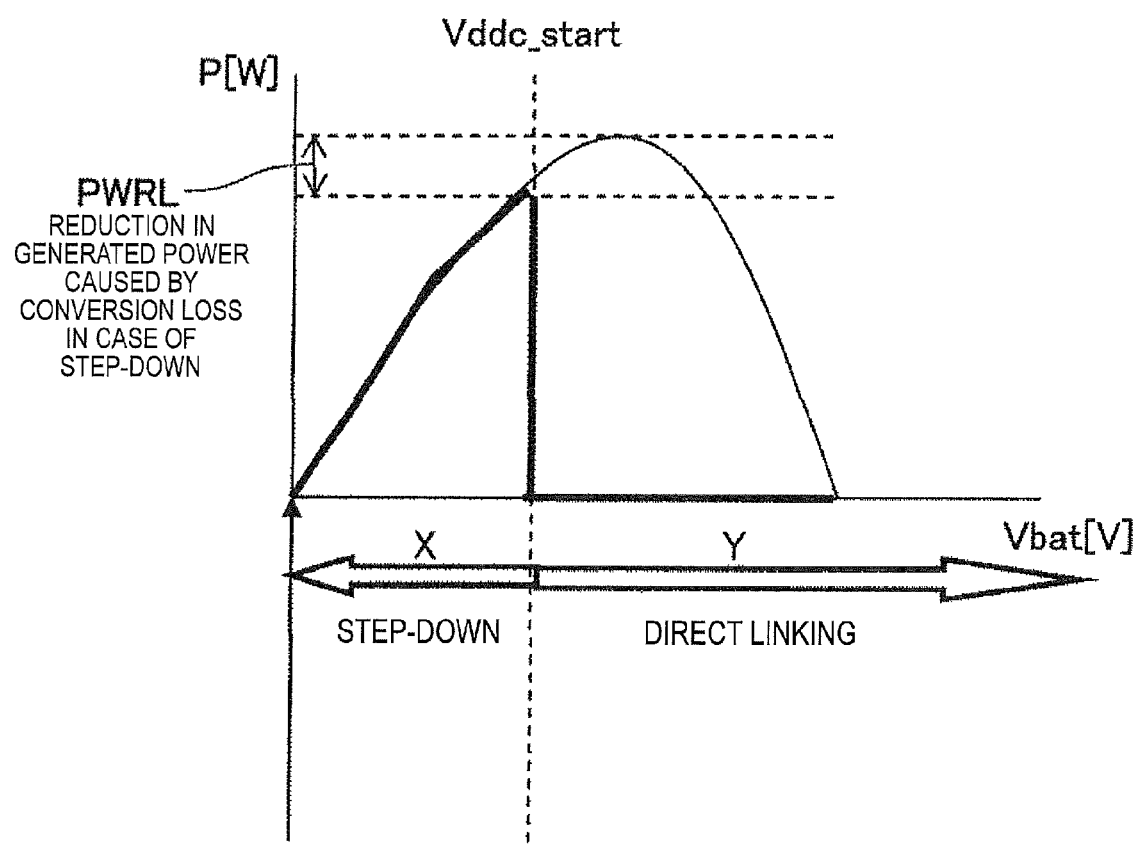
FIG. 15 is a diagram showing the concept of the step-down direction coupling switching control according to the embodiment of the present disclosure in more detail.

FIG. 15 is a diagram showing the concept of the step-down direction coupling switching control according to the embodiment in more detail.

As described above, the first control unit 34 sets a voltage that satisfies $V_{BAT} \leq Vpm$ to be a switching threshold value of step-down direct coupling switching control.

For example, the first control unit 34 sets the voltage Vddc_start for determining whether the voltage $V_{BAT}$ of the storage element 40 is lower than the maximum power point voltage Vpm of the power generating element 20 to be the switching threshold value.

In FIG. 15, PWRL indicates a reduced amount of generated power caused by conversion loss in the case of step-up.

In FIG. 15, the region indicated by the symbol X is a region in which the voltage $V_{BAT}$ of the storage element 40 is lower than or equal to the switching threshold voltage Vddc_start. In this region X, step-down is performed. In this case, the path switching signal PATH is set to a high level.

The region indicated by the symbol Y is a region in which the voltage $V_{BAT}$ of the storage element 40 is equal to or higher than the switching threshold voltage Vddc_start.

In this region, direct coupling (direct linking) without step-down is basically advantageous.

In this region X, step-down is not possible, or the loss of the amount of step-down from near the MPP is great. Thus, direct linking without step-down is advantageous in this region X. In this case, the path switching signal PATH is set to a low level.

Herein, since there are cases in which a power generation output voltage by the power generating element 20 affects operations if the voltage is equal to or higher than a certain level of voltage, in the present embodiment, a maximum compensation threshold voltage Vddc_max is set for the power generation output voltage.

Figure 16:
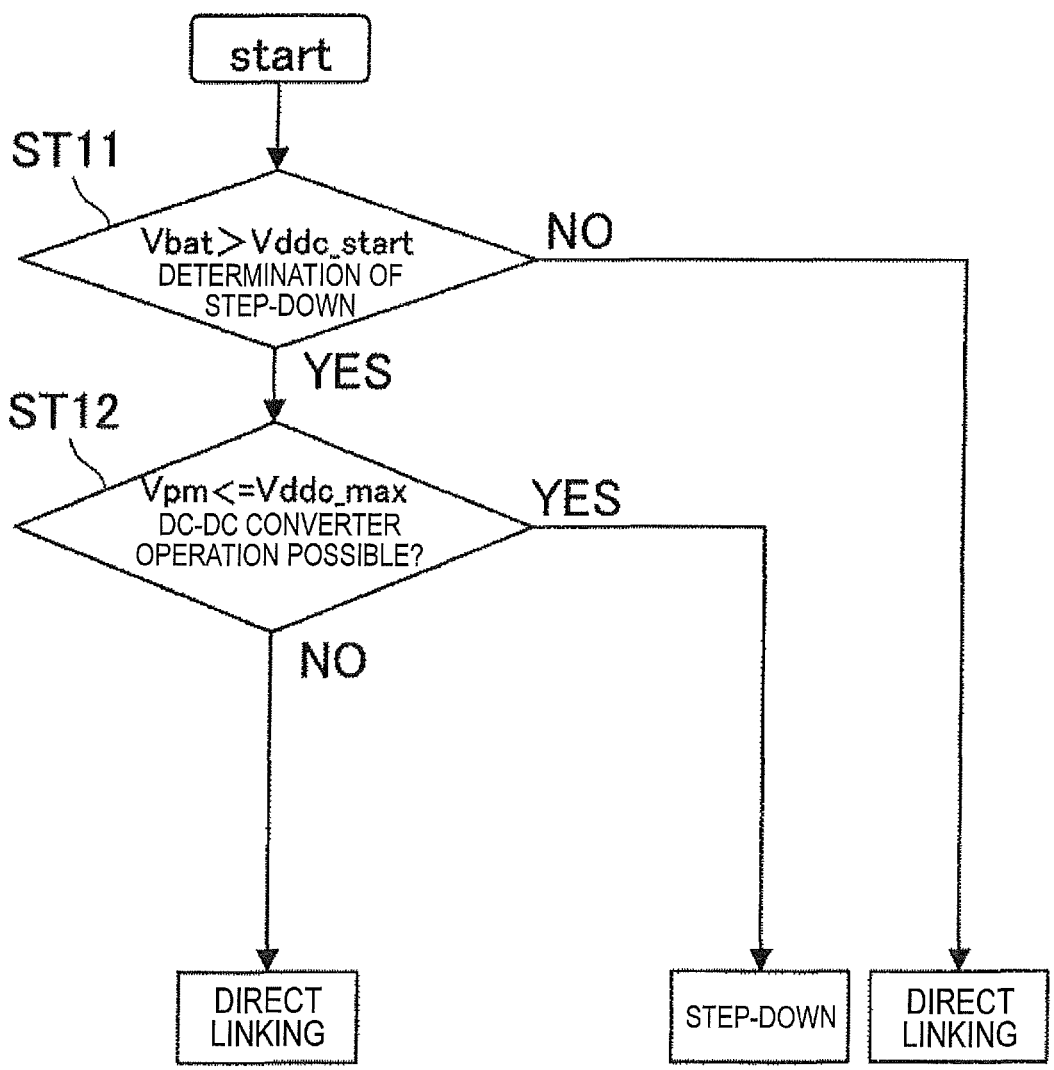
FIG. 16 is a flowchart showing an example of a state determination process for determining whether the power generating element (solar battery) is to be connected to the step-down system or directly coupled with the storage element according to the embodiment of the present disclosure.

FIG. 16 is a flowchart showing an example of a state determination process for determining whether the power generating element (solar battery) is to be connected to the step-down system or directly coupled with the storage element according to the embodiment.

First, the first control unit 34 determines whether or not the voltage VBAT of the storage element 40 is lower than the switching threshold voltage Vddc_start (ST11).

In Step ST11, when the voltage VBAT of the storage element 40 is determined to be equal to or higher than the switching threshold voltage Vddc_start, the first control unit 34 outputs a low level of the path switching signal PATH to the power switch circuit 32.

When the low level of the path switching signal PATH is received, the power switch circuit 32 causes the voltage conversion unit 31 to be disconnected from the storage element 40 that is a load so as to form a path in which the power generating element 20 is directly connected to (directly coupled with) the storage element 40 side.

In Step ST11, when the voltage VBAT of the storage element 40 is determined to be lower than the switching threshold voltage Vddc_start, the first control unit 34 determines whether or not the maximum power point voltage Vpm is lower than or equal to the maximum compensation threshold voltage Vddc_max (ST12).

In Step ST2, when the maximum power point voltage Vpm is lower than or equal to the maximum compensation threshold voltage Vddc_max, the first control unit 34 outputs a low level of the path switching signal PATH to the power switch circuit 32.

When the high level of the path switching signal PATH is received, the power switch circuit 32 causes the power generating element 20 to be connected to the voltage connection unit 31 so as to form a path in which an output thereof is connected to the storage element 40 side.

As above, in the present embodiment, determination of whether or not to perform step-down (direct coupling of the solar battery with the storage battery) can be attained with high accuracy using a simple circuit.

[Specific Configuration Example of the Voltage Conversion Unit 31]

Figure 17:
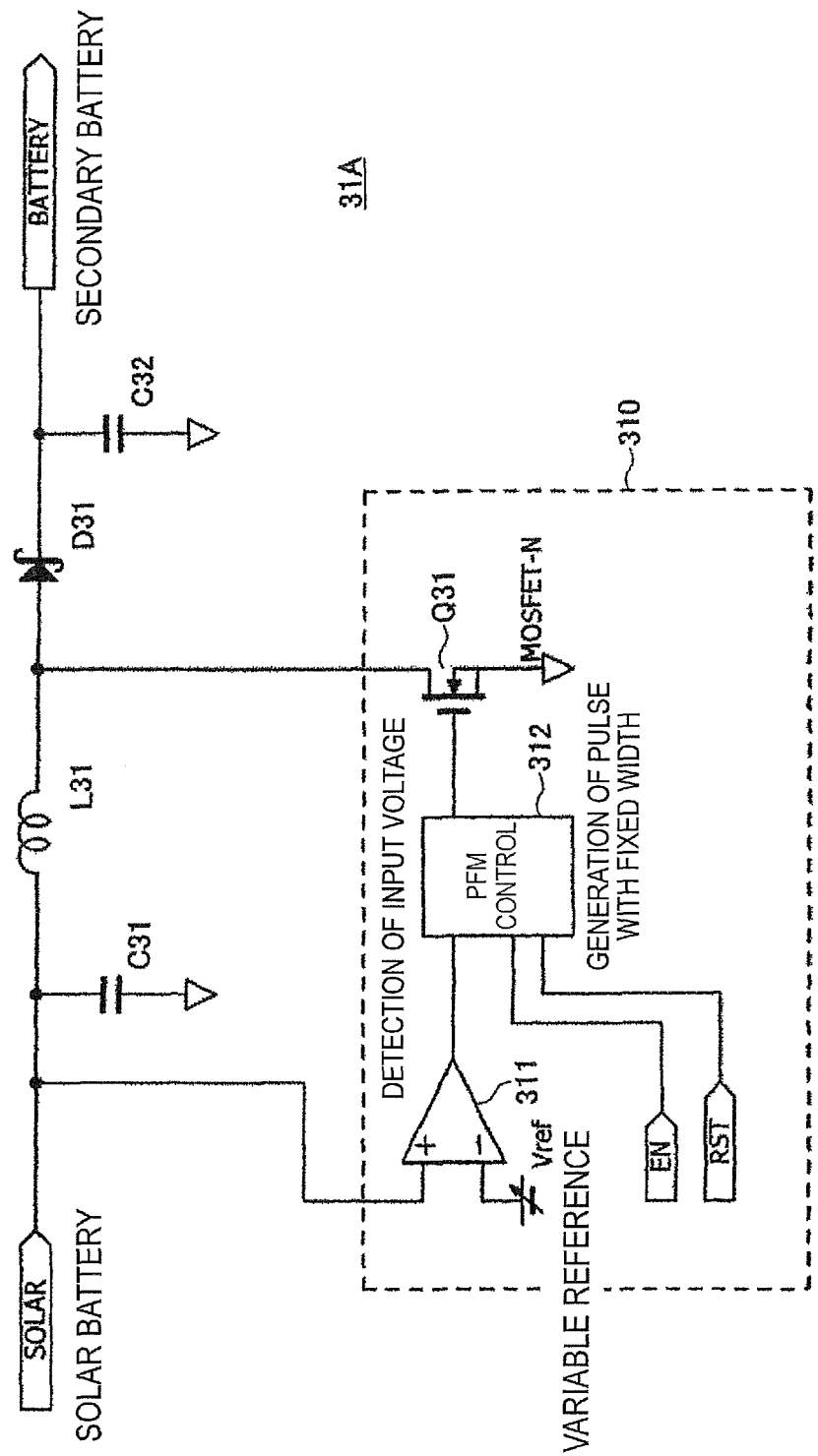
FIG. 17 is a circuit diagram showing a basic configuration example of a step-up switching regulator as a voltage conversion unit according to the embodiment of the present disclosure.

FIG. 17 is a circuit diagram showing a basic configuration example of a step-up switching regulator as a voltage conversion unit according to the embodiment.

This switching regulator 31A includes a power generating element side capacitor C31, an inductor L31, a diode D31, a secondary battery side capacitor C32, and an operation voltage control unit 310 as main constituent elements. The switching regulator is configured as a DC-DC converter.

The operation voltage control unit 310 has a switching transistor (SW) Q31, a comparator 311 as an input voltage detection unit, and a PFM (pulse frequency modulation) control unit 312.

The comparator 311 compares a variable reference voltage Vref supplied by the first control unit 34 to an input voltage V1 that is a voltage generated in the power generating element (solar battery) 20.

The comparator 310 causes an output to be switched to a high level when the input voltage V1 exceeds the reference voltage Vref.

The PFM control unit 312 generates pulses with a fixed width from the output of the comparator 311, and causes the switching transistor Q31 to be turned on for a predetermined time.

The PFM control unit 312 enters an enable state according to an enable signal EN and is configured to be resettable by a reset signal RST.

Figure 18:
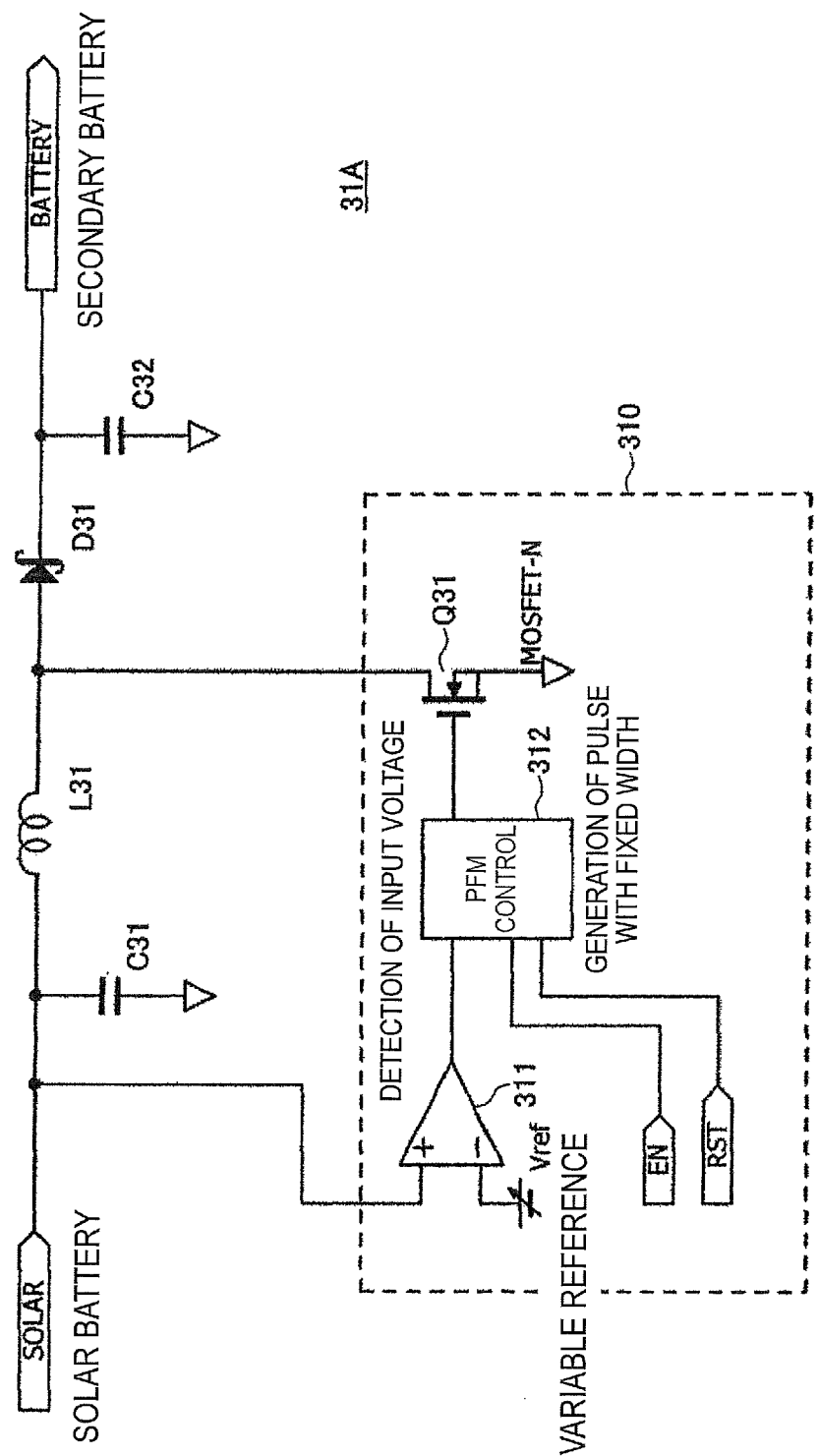
FIG. 18 is a diagram for describing a basic operation of the step-up switching regulator.

FIG. 18 is a diagram for describing a basic operation of the step-up switching regulator.

The step-up switching regulator performs a switching operation using self-oscillation.

A power point (operation voltage) of the power generating element (solar battery) 20 connected to an input is controlled.

An input is a voltage generated by the power generating element 20, an output is a storage element 40 (secondary battery (Li+ battery)), and MPPT is performed using power point control of the power generating element (solar battery) 20.

Basically, when the switching transistor Q31 is turned on, the step-up switching regulator accumulates energy in the inductor L31 using a current flowing thereinto as shown in FIG. 18.

When the switching transistor Q31 is turned off, the inductor L31 releases the accumulated energy.

Accordingly, the energy of the inductor L31 is added to the input voltage V1. As a result, the input voltage is stepped up.

Next, based on the above-described basic operation, an operation of the step-up switching regulator of FIG. 17 according to the present embodiment will be described.

FIG. 19 is a diagram for describing an operation of the step-up switching regulator of FIG. 17.

<1> When the input voltage V1 exceeds the reference voltage Vref, an output of the comparator 311 becomes a high level.

<2> In response to the output of the comparator 311, the PFM control unit 312 generates pulses with a fixed width (SW=ON). Accordingly, the energy of the inductor L31 is released.

<3> When the input voltage V1 is lower than the reference voltage Vref, the output of the comparator 311 becomes a low level, and the switching transistor Q313 is turned off.

Accordingly, an operation of charging energy to the inductor L31 is performed from the release of the energy accumulated in the inductor 31.

The above operations are repeated.

In this case, the power generating element (solar battery) 20 is operated using a voltage near the reference voltage Vref.

With a change in this reference voltage Vref by the first control unit 34, the power point (operation voltage) of the power generating element (solar battery) 20 can be controlled.

Note that, in the present embodiment, when step-up is not performed, a shut down function by which the comparator and the PFM control circuit are shut down can be obtained.

In addition, as described above, a reset function by which reset is made when self-oscillation is stopped for any reason can be obtained.

In addition, since the peak current of the inductor L31 is affected by the time for which the switching transistor Q31 is turned on, the time of turning on can also be configured to change depending on an input current and the connected power generating element (solar battery).

A PFM pulse width (switch-on time) should be adjusted so that the peak current of the inductor L31 converges within a fixed range.

In terms of a rating, noise, efficiency, and the like, it is desirable to be able to select the width from a number of types for each range depending on cases.

In addition, the voltage conversion unit can be configured as below.

A change in the peripheral environment is detected from a change in a switching frequency.

In this case, the number of switching times is counted every Δt, and the difference from the previous time is obtained.

A change in the switching frequency is measured, and if the frequency is high, the amount of power generation is deemed to increase, and thus the reference voltage Vref is changed and the path is switched.

If the frequency is low, the amount of power generation is deemed to decrease, and the reference voltage Vref is changed in response thereto, the path is switched, and a step-up operation is stopped.

In addition, a current is measured from the switching frequency.

If the reference voltage Vref and the time of turning on the switching transistor Q31 are fixed, the switching frequency is dependent on an input current.

Accordingly, a current can be computed from the switching frequency.

Herein, a specific configuration example in which the reference voltage Vref is changed according to an increase or decrease of the switching frequency will be described.

Figure 20:
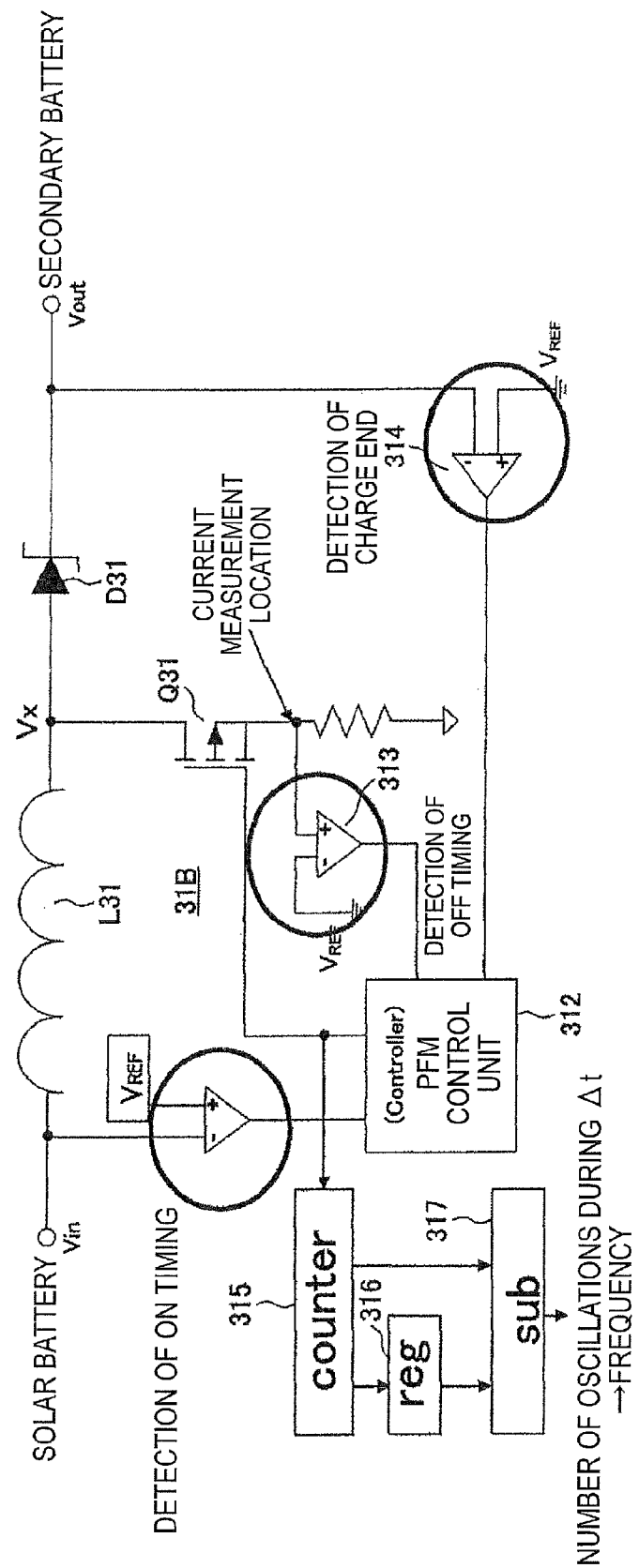
FIG. 20 is a circuit diagram showing a configuration example of a step-up switching regulator which includes a detection system that detects changes in an operation frequency in a PFM control unit of FIG. 17.

FIG. 20 is a circuit diagram showing a configuration example of a step-up switching regulator which includes a detection system that detects changes in an operation frequency in a PFM control unit of FIG. 17.

In FIG. 20, the same reference numerals are given to the same constituent parts as those of FIG. 17 for easy understanding.

A switching regulator 31B of FIG. 20 includes an OFF timing detection unit 313, a charge end detection unit 314, a counter 315, a register 316, and a subtractor 317 in addition to the configuration of FIG. 17.

The OFF timing detection unit 313 and the charge end detection unit 314 can be configured as comparators.

A resistor R31 is connected between a source of the switching transistor Q31 and a reference potential VSS, and a node ND 31 is formed by the connection point.

The OFF timing detection unit 313 compares a threshold value Vref1 and the potential of the node ND31 so as to detect an OFF timing of the switching transistor Q31, and outputs the detection result to the PFM control unit 312.

The charge end detection unit 314 compares an output voltage (the potential on the cathode side of the diode) and a threshold value Vref2 so as to detect charge end, and outputs the detection result to the PFM control unit 312.

With a change in the current (change in illuminance) of the power generating element 20 that is a solar battery, an operation frequency of the PFM control unit 312 that is a transformation circuit changes.

The charge time of the inductor L31 changes due to the change in the current (change in illuminance) of the power generating element 20. In this case, the charge time is shortened as the amount of the current increases.

When the transformation circuit (PFM) is used, the change in illuminance can be measured based on the change in the switching frequency.

In this technique, control can be performed using a change in a low power frequency as a trigger since an ADC is not used, in comparison to the technique of measuring an open voltage by periodically stopping the PFM control unit 312 that is a transformation circuit.

In the example of FIG. 20, the frequency can be measured by counting a gate control signal of the switching transistor Q31 with the counter 315.

The frequency can be determined to be high as the current of the power generating element 20 that is a solar battery is high.

It can be determined that the frequency is low or switching is in a stop state as the current of the power generating element 20 that is a solar battery solar battery is low.

In addition, under the control unit of the first control unit 34, when the change in the frequency is equal to or higher than a preset value, the I-V characteristic (or short-circuit current) is measured again, and MPPT control is redone.

In addition, it may be configured such that measurement is performed again when the change becomes great.

In the measurement of the frequency, a switching pulse signal of the PFM control unit 312 that is a transform circuit is counted by the counter 315. Then, polling is M periodically performed for the count value, and a difference can be obtained by the subtractor 317.

By setting a following trigger to be the change in the frequency, the number of times the deviation of the MPPT is measured can be lowered, and then control power can be reduced.

In addition, in the MTTP control, control in accordance with a temperature change can also be performed.

Figure 21:
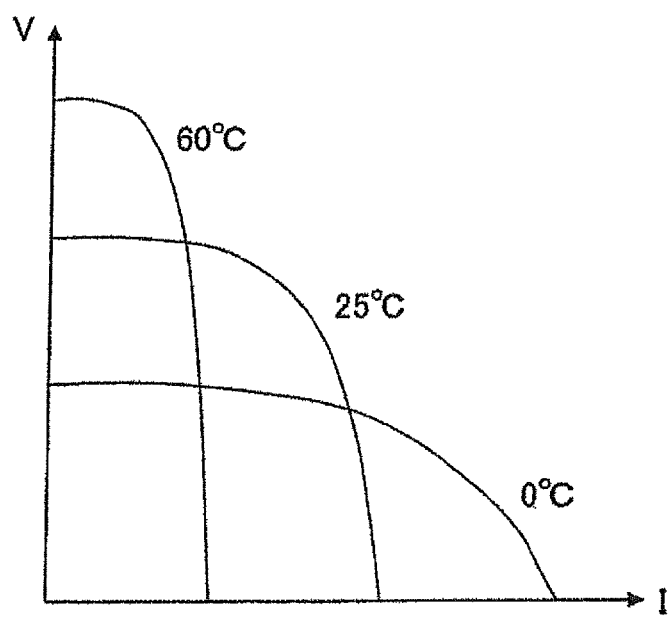
FIG. 21 is a diagram showing the state in which an I-V characteristic of the power generating element (solar battery) changes in accordance with a temperature change.

FIG. 21 is a diagram showing the state in which the I-V characteristic of the power generating element (solar battery) changes in accordance with a temperature change.

As shown in FIG. 21, since the I-V characteristic of the power generating element (solar battery) changes in accordance with a temperature change, the thermistor 50 is monitored by the second control unit 35, and the detected temperature information is supplied to the first control unit 34.

The first control unit 34 selects a coefficient corresponding to a temperature in advance in accordance with the temperature information, and performs the MTTP control following temperature conversion by, for example, multiplying the coefficient by the reference voltage Vref of the MTTP control.

In this case, in general temperature range of about ±10 to 15 from the normal temperature of 25° C., general MTTP control is performed, and various forms can be performed using a first coefficient in a temperature range higher than the general temperature range, using a second coefficient in a temperature range lower than the general temperature range, or the like.

The MTTP control herein can be applied not only to control of the voltage conversion unit 31 but also to connection switching of power paths of the power switch circuit 32.

Figure 22:
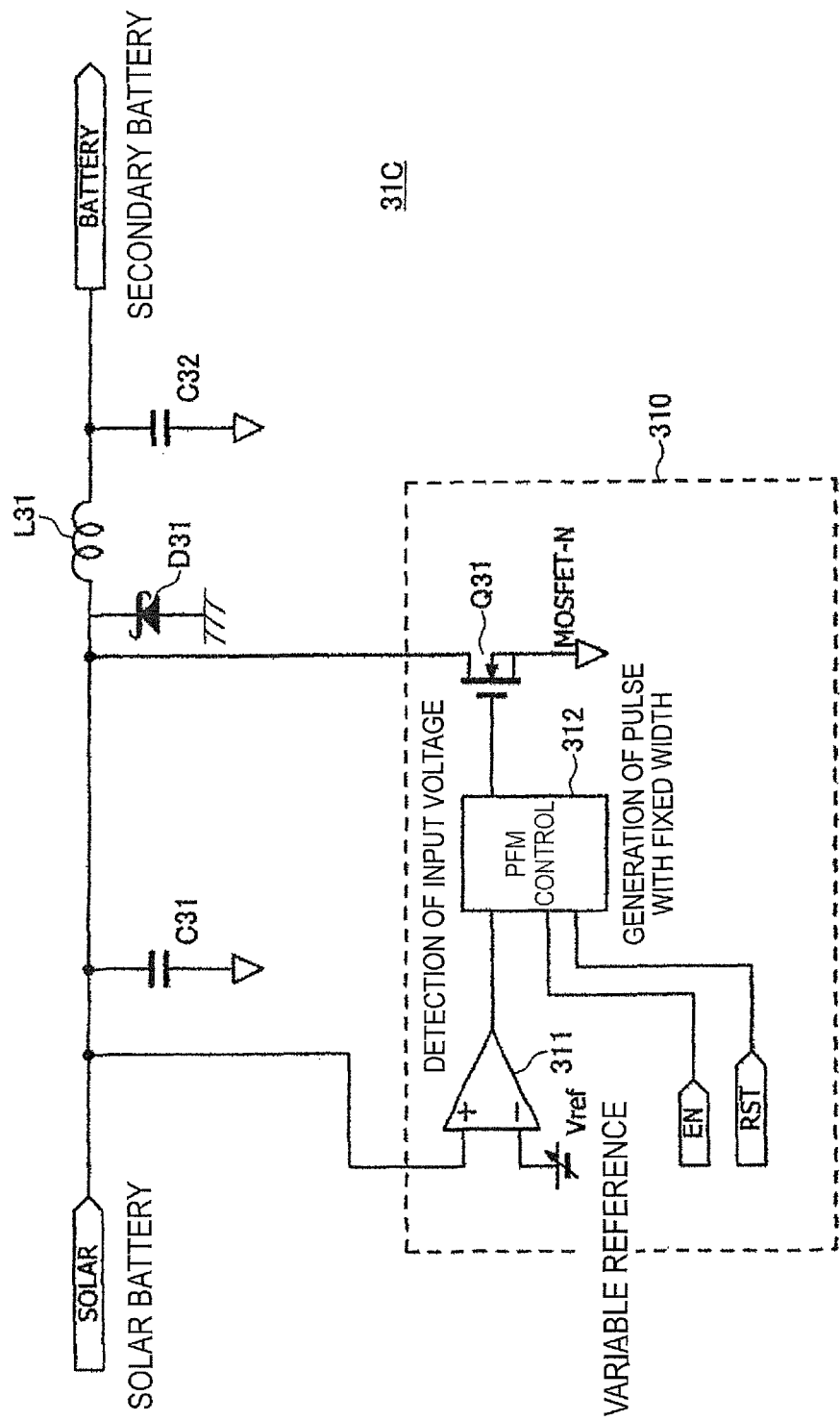
FIG. 22 is a circuit diagram showing a basic configuration example of a step-down switching regulator as a voltage conversion unit according to the embodiment of the present disclosure.

Note that, in the above description, the voltage conversion unit 31 is set to be a step-up switching regulator, but a step-down switching regulator 31C as shown in FIG. 22 can be applied.

This step-down switching regulator 31C basically has the same configuration except that the connection form of the step-up type and the inductor L31 and the diode D31 is different.

Thus, the circuit configuration of FIG. 20 can be applied without change.

[Configuration Example of Backflow Prevention Circuit]

Figure 23:
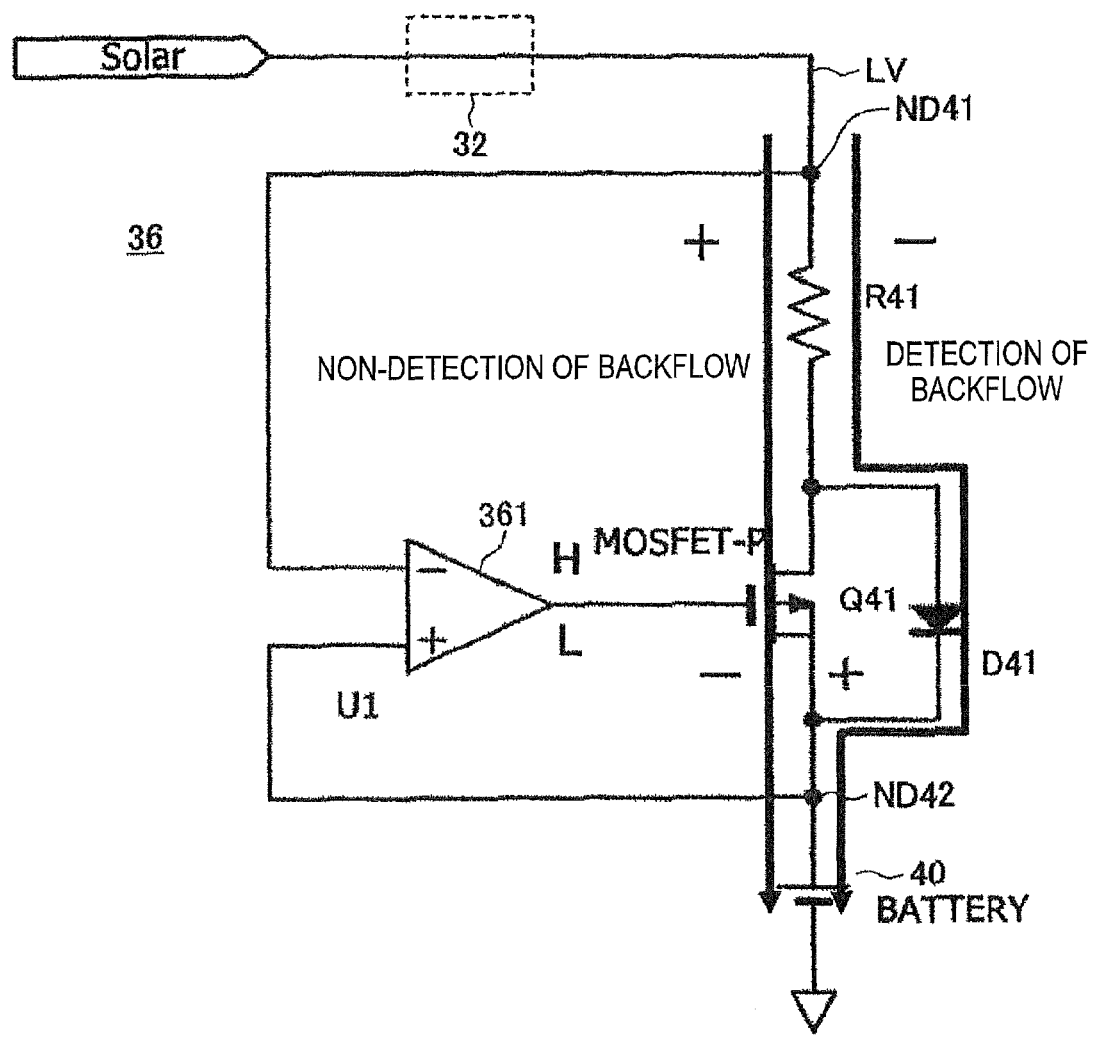
FIG. 23 is a circuit diagram showing a configuration example of a backflow prevention circuit according to the embodiment of the present disclosure.

FIG. 23 is a circuit diagram showing a configuration example of a backflow prevention circuit according to the embodiment.

The backflow prevention circuit 36 is disposed in a voltage supply line LV from the output of the power switch circuit 32 to the storage element 40.

This backflow prevention circuit 36 includes a resistor R41, a switching transistor Q41 formed of a PMOSFET, a diode D41, and a comparator 361.

Between a power generating element side note ND41 of the voltage supply line LV1 and the storage element 40 side node ND42, the resistor R41 and the switching transistor Q41 are connected in series, and the diode D41 for backflow prevention is connected in parallel with the switching transistor Q41.

The comparator 361 compares the potential of the node ND41 and the potential of the node ND42 so as to turn the switching transistor Q41 on or off based on the result.

The backflow prevention circuit 36 performs bypass control of the diode for preventing backflow from the storage element 40 to the power generating element (solar battery) 20.

The backflow prevention circuit 36 reduces losses caused by a forward voltage VF while preventing backflow.

When the state is not of backflow due to the potential of the node ND41 higher than that of the node ND42, the output of the comparator 361 becomes a low level as non-detection of backflow.

As a result, the switching transistor Q41 is turned on so as to bypass the diode D41 for backflow prevention.

When the state is of backflow due to the potential of the node ND42 higher than that of the node ND41, the output of the comparator 361 becomes a high level as detection of backflow.

As a result, the switching transistor Q41 is turned off so as to form a connection line only of the diode D41 for backflow prevention.

Note that, in the above configuration, it is necessary to make the loss caused by the backflow prevention circuit smaller than the loss caused by connection of diode.

It is also possible to be able to detect backflow only by on-resistance of an MOSFET.

It is desirable to suppress consumption power of the comparator 361 as much as possible.

In addition, it is also possible to perform backflow prevention using characteristics of a secondary battery.

In this case, after a battery voltage is rapidly lowered during charging, only the diode D41 for backflow prevention forms the connection line (charge voltage>discharge voltage).

[Charge Control of Storage Element]

Next, charge control for the storage element (storage battery) 40 focusing on the second control unit 35 will be described.

Figure 24:
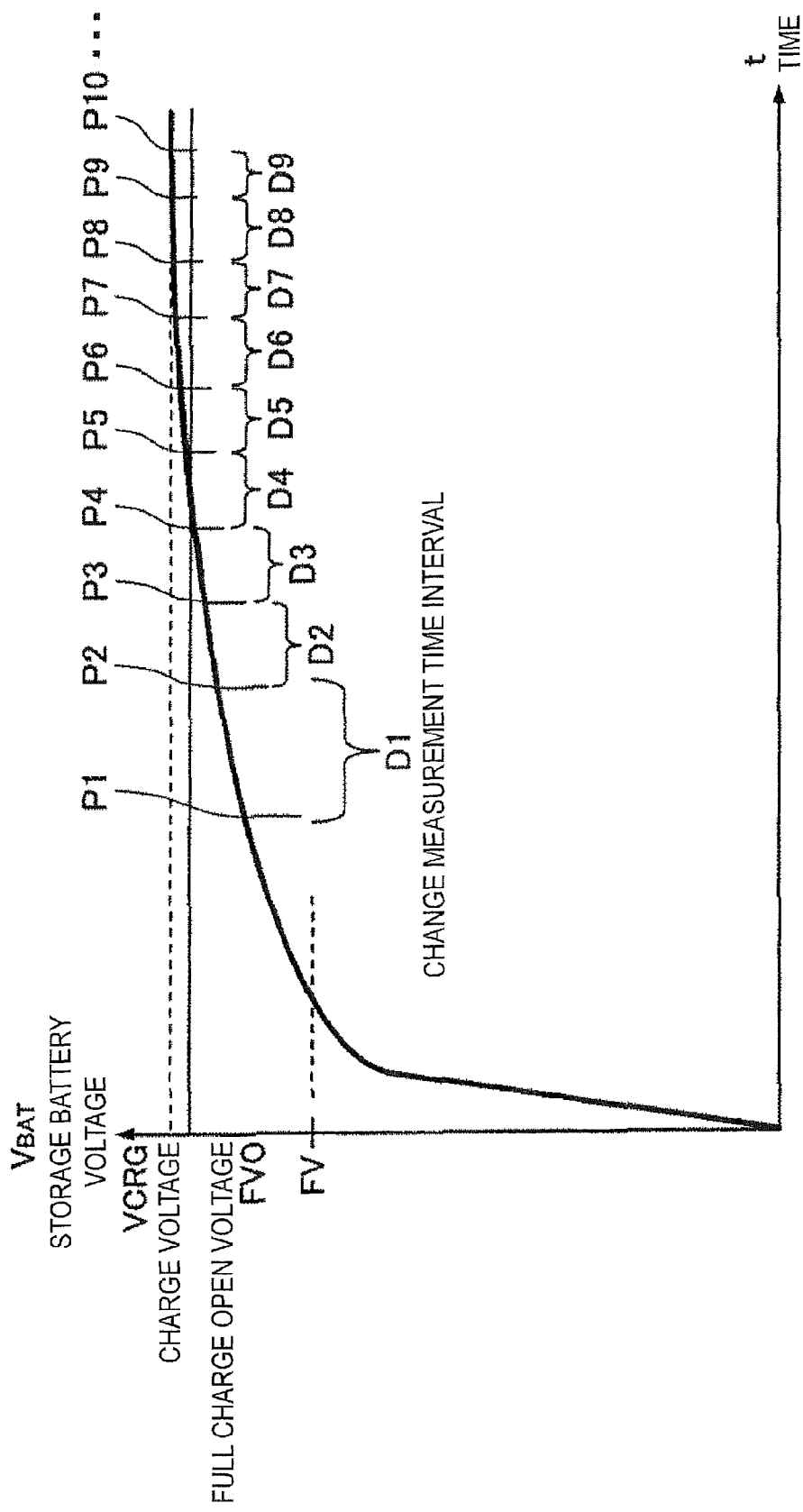
FIG. 24 is a diagram for describing first charge control for the storage element (storage battery) according to the embodiment of the present disclosure.

FIG. 24 is a diagram for describing first charge control for the storage element (storage battery) 40 according to the embodiment.

In FIG. 24, the horizontal axis represents time and the vertical axis represents the voltage $V_{BAT}$ of the storage element 40.

In addition, in FIG. 24, FV indicates a voltage that is regarded substantially as full charge, FVO indicates full charge open voltage, and VCRG indicates a charge voltage, respectively.

Further, in FIG. 24, P1 to P10 (Pn) indicate measurement points at which the voltage $V_{BAT}$ of the storage element 40 is measured (monitored) by opening the terminal of the storage element 40.

In addition, in FIG. 24, D1 to D9 indicate time intervals between the adjacent measurement points, and are in the relationship of D1>D2>D3>D4>D5>D6>D7>D8>D9.

In other words, the second control unit 35 controls so that the intervals of the measurement points at which the voltage VBAT of the storage element 40 is measured (monitored) by opening the terminal of the storage element 40 are dynamically changed in accordance with the voltage $V_{BAT}$ of the storage element 40.

In the present embodiment, the second control unit 35 controls so that the intervals of the measurement points are shortened as the voltage $V_{BAT}$ of the storage element 40 becomes higher.

As described above, the power control device 30 according to the present embodiment employs charge control to the storage battery in which full charge can be detected by comparing a terminal open voltage of the storage element 40 to a threshold voltage.

Then, the second control unit 35 of the power control device 30 monitors the voltage of the storage element 40 and controls as follows when the voltage $V_{BAT}$ of the storage element 40 during terminal opening reaches or exceeds the full charge voltage FV.

The second control unit 35 can perform charge control in which charging is stopped by, for example, a control signal CTL35, and controls so that a terminal opening time interval D of the storage element 40 is shortened as the voltage $V_{BAT}$ of the storage element 40 becomes higher by the control signal CTL35.

In addition, in the case of charge from a power source in which the output of the power generating element 20 of a solar battery or the like fluctuates to the storage element 40, the power control device 30 controls so that the opening time interval D is shortened as the output voltage VC1 of the power generating element (power source) 20 supplied from the characteristic measurement circuit 33.

As above, the second control unit 35 according to the present embodiment has a function of dynamically changing the open voltage measurement time interval D of the storage element 40 based on the control signal CTL35.

The second control unit 35 changes the open voltage measurement time interval D depending on the voltage $V_{BAT}$ of the storage element 4. Specifically, as the voltage $V_{BAT}$ of the storage element 40 becomes higher, the measurement time interval D is shortened.

In addition, the second control unit 35 changes depending on an output voltage VC1 of the power generating element (solar battery) 20. Specifically, as the output voltage VC1 of the power generating element (solar battery) 20 becomes higher, the measurement time interval D is shortened.

Note that the second control unit 35 can also change the open voltage measurement time interval D depending on the voltage VBAT of the storage element 4 and the output voltage VC1 of the power generating element (solar battery) 20.

Even when the voltage of the storage element 40 is equal to or higher than the full charge open voltage, the second control unit 35 controls the terminal opening time interval of the storage element to be changed according to the storage element 40 or the power generating element 20.

By the charge control as above, a charge loss during detection of full charge can be reduced or over-charge can be prevented during charging of the storage element (storage battery).

Figure 25:
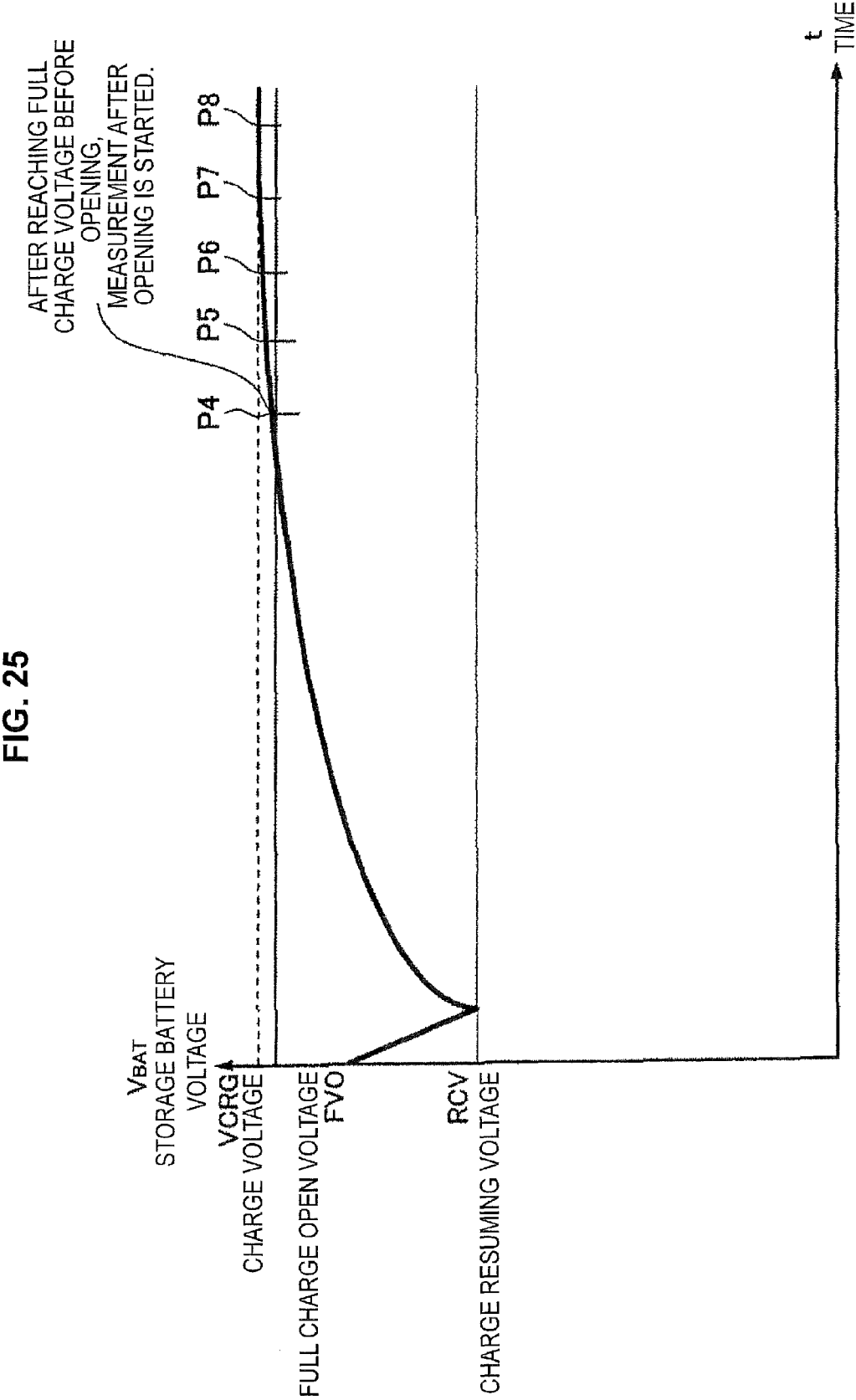
FIG. 25 is a diagram for describing second charge control for the storage element (storage battery) according to the embodiment of the present disclosure.

FIG. 25 is a diagram for describing second charge control for the storage element (storage battery) 40 according to the embodiment.

A difference of the second charge control of FIG. 25 from the charge control of FIG. 24 is that the terminal of the storage element 40 is not open until the charge voltage approaches the full charge open voltage FVO.

Accordingly, a charge loss caused by opening of the storage element 40 decreases.

In other words, after the voltage reaches the full charge voltage FV before opening, the terminal of the storage element 40 is opened to start measurement.

In this case, the open voltage measurement time interval D may be configured to be fixed, or changed depending on the voltage $V_{BAT}$ of the storage element 4, in the same manner as in the first charge control method.

In the second charge control method, the second control unit 35 of the power control device 30 controls as follows when the voltage during opening of the terminal of the storage element reaches or exceeds the full charge voltage.

When charge control is performed to stop charging, the second control unit 35 controls not to detect full charge with the terminal of the storage element 40 open until the voltage during charging is equal to or higher than the full charge voltage FVO without opening the terminal of the storage element 40.

Accordingly, the power control device 30 can reduce the charge loss during the detection of full charge and prevent over-charge in charging of the storage element 40.

[Charge Control]

Next, charge control of the storage element 40 by the current voltage limiting circuit 37 of the power control device 30 will be described.

Figure 26:
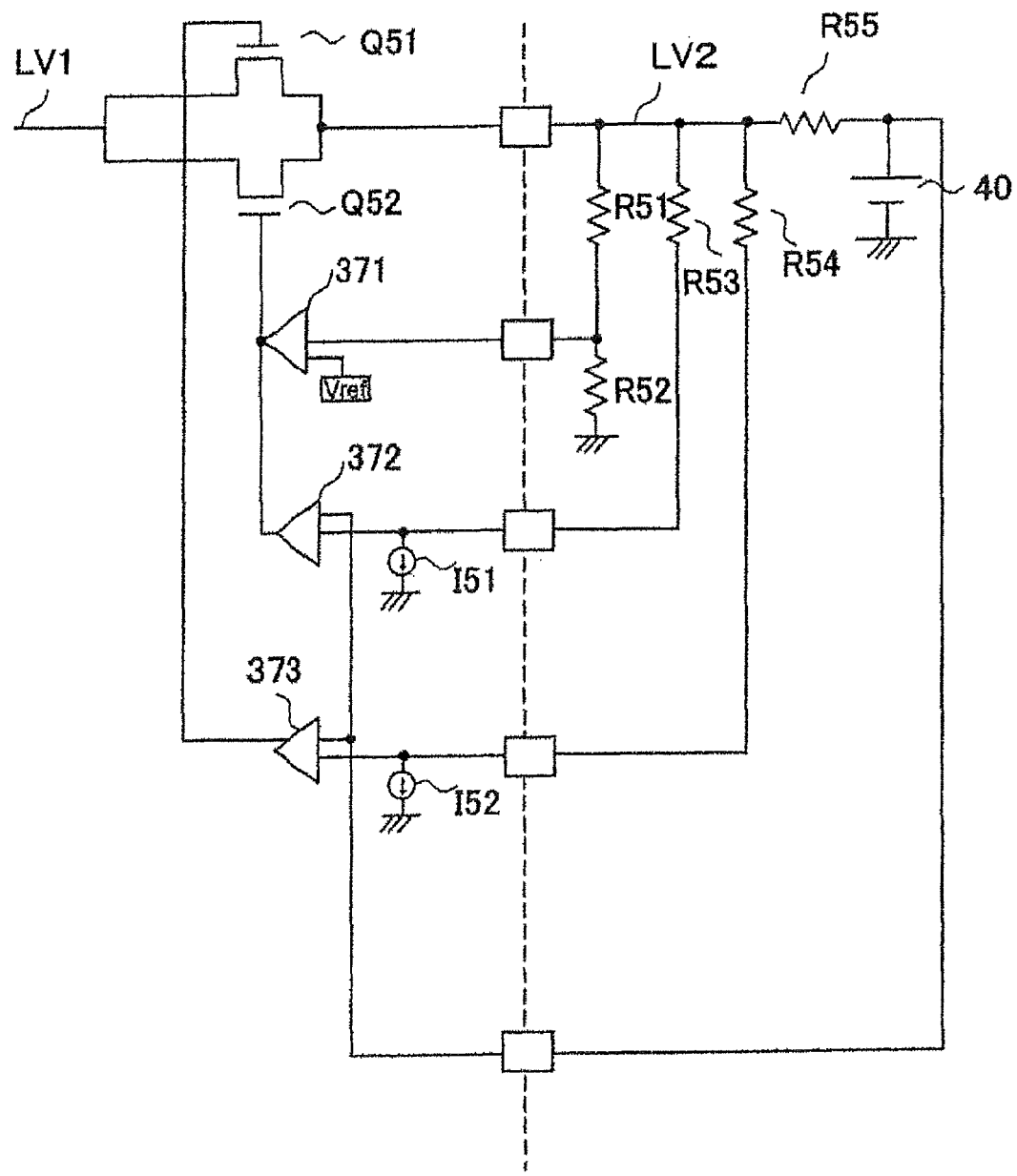
FIG. 26 is a circuit diagram showing a configuration example of a current voltage limiting circuit according to the embodiment of the present disclosure.

FIG. 26 is a circuit diagram showing a configuration example of the current voltage limiting circuit according to the embodiment.

The current voltage limiting circuit 37 has MOSFETs Q51 and Q52 disposed on the power supply line, error amplifiers 371 to 373, constant current sources I51 and I52, and external resistors R51 to R55.

In the current voltage limiting circuit 37, gate potentials of the MOSFETs Q51 and Q52 are controlled by the error amplifiers 371 to 373.

A control voltage is the reference voltage Vref1 given to the error amplifier 371 in the case of voltage regulation.

In the case of current regulation, the control voltage is set to be the amount of a voltage drop when the current is pulled from the path of R55 of the storage element (BAT) 40 using the constant current sources I51 and I52.

In addition, two types of control of maximum limit and initial charge limit are provided.

[ΔV Detection Technique]

After CV charging, ΔV detection is started in a cycle of, for example, 5 minutes, or the like.

The reason for setting the cycle to be 5 minutes is based on the performance of output power of the power generating element (solar battery) 20 and the charge capacity of the storage element 40, or the like.

Charging is stopped during ΔV detection, and an open voltage of the storage element 40 is measured.

The time for which charging is stopped is 2 seconds, 3 seconds, or the like. The time of stopping is based on the performance of an ADC or the storage element 40.

In the present embodiment, the difference between the charge voltage before opening the storage element 40 and the voltage when the terminal of the storage element is open is measured as ΔV, and when the difference ΔV is smaller than or equal to a given value, for example, smaller than or equal to the value of 50 mV, or the like, charging is stopped.

[Overall Charge Control]

Next, charge control of the storage element 40 by the power control device 30 will be described.

Figure 27:
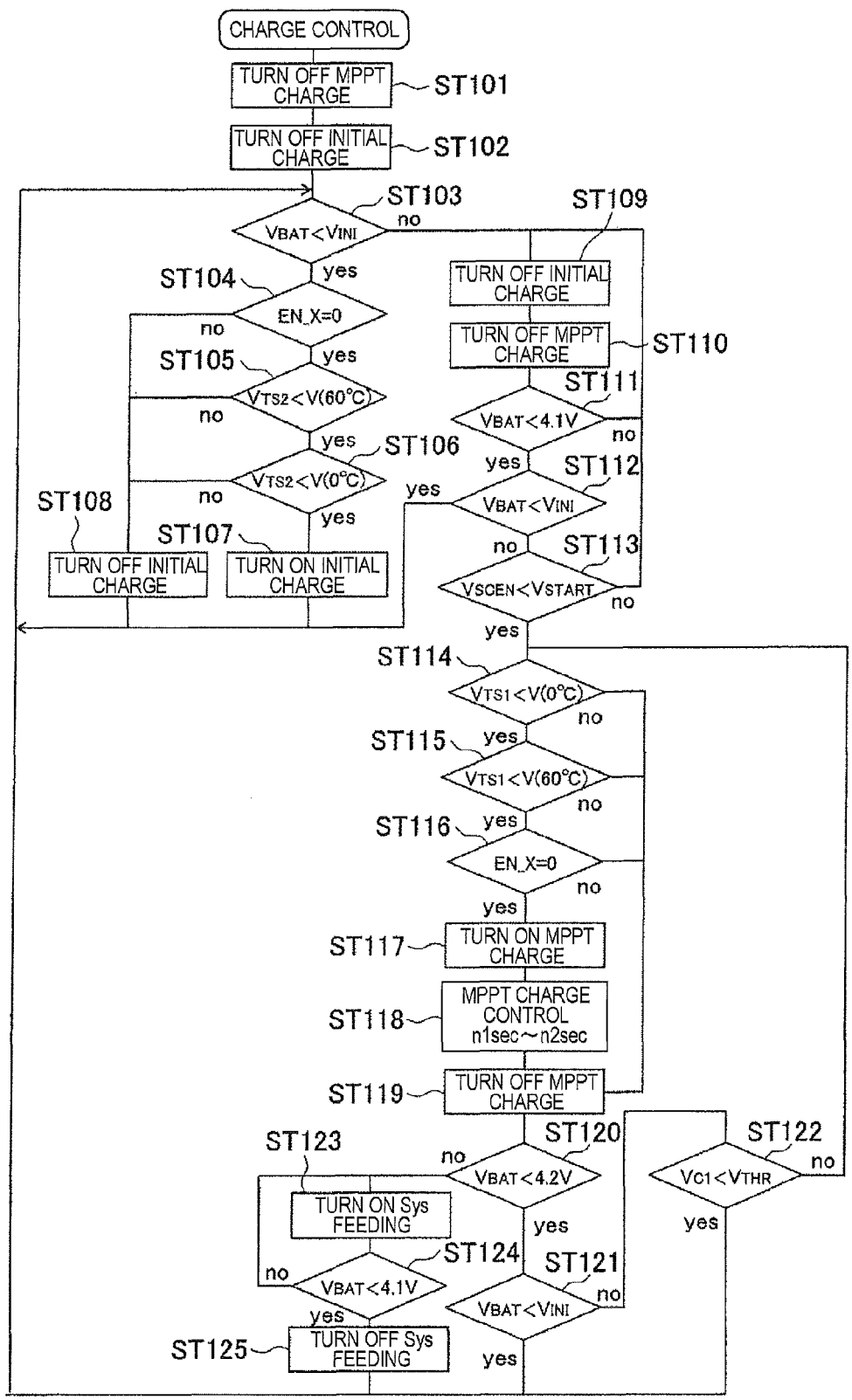
FIG. 27 is a flowchart for describing overall charge control of a power control device according to the embodiment of the present disclosure.

FIG. 27 is a flowchart for describing overall charge control of the power control device according to the embodiment.

Herein, the second control unit 35 performs control for the power switch circuit 32, or the like, based on a detection result, or the like of the thermistor 50.

In the description below, overall charge control including operations of this second control unit 35 and the start-up circuit 38 will be described.

First, in a state in which MPPT charge is set to be turned off (ST101), and initial charge is set to be turned off (ST102), determination of whether or not the input voltage VIN by the power generating element 20 is higher than voltage $V_{BAT}$ of the storage element 40 is performed (ST103).

When the input voltage VIN is determined to be higher than the voltage $V_{BAT}$ of the storage element 40 in Step ST103, it is determined whether a charge enable signal EN_X of a low active is a low level (ST104).

When the charge enable signal EN_X is a low level, and the temperature on the thermistor 50 is not lower than or equal to 0° (ST105), and not equal to or higher than 60° (ST106), initial charge is turned on (ST107).

Accordingly, the initial charge is performed for the storage element 40 by power generated in the power generating element 20. Then, the process returns to the process of Step ST103.

In addition, when negative determination results are obtained in Steps ST105 to ST107, the process returns to the process of Step ST103 with the initial charge turned off (ST108).

When the input voltage VIN is determined to be lower than the voltage $V_{BAT}$ of the storage element 40 in Step ST103, the initial charge turns off (ST109) and MTTP charge is held to be turned off (ST110).

Next, it is determined whether or not the voltage $V_{BAT}$ of the storage element 40 is lower than 4.1 V obtained by limiting 4.2 V at the time of full charge (ST111).

When the voltage $V_{BAT}$ of the storage element 40 is lower than 4.1V, it is determined whether or not the input voltage VIN by power generating elements 20-1 and 20-2 is higher than the voltage $V_{BAT}$ of the storage element 40 (ST112).

When the input voltage VIN is higher than the voltage $V_{BAT}$ of the storage element 40, the process returns to the process of Step ST103, and when the input voltage VIN is lower than the voltage $V_{BAT}$ of the storage element 40, it is determined whether or not a starting voltage VSTART is lower than a starting threshold voltage VSCEN of a charge system circuit (ST113).

When the starting voltage VSTART is higher than the starting threshold voltage VSCEN, the process returns to the process from Step ST109.

When the starting voltage VSTART is lower than the starting threshold voltage VSCEN, the following is performed.

In other words, when the temperature on the thermistor 50 is not lower than or equal to 0° (ST114) and not equal to or higher than 60° (ST115), and when the charge enable signal EN_X is a low level (ST116), MTTP charge is turned on (ST117).

Accordingly, for example, when switching is performed so that the voltage conversion unit 31 is applied, MPPT charge control is performed (ST118).

After the MPPT charge control, the MPPT charge is turned off (ST119), and it is determined whether or not the voltage VBAT of the storage element 40 is lower than 4.2 V at the time of full charge (ST120).

When the voltage $V_{BAT}$ of the storage element 40 is lower than 4.2 V at the time of full charge, it is determined whether or not the input voltage VIN is higher than the voltage $V_{BAT}$ of the storage element 40 (ST121), and when the input voltage VIN is higher than the voltage $V_{BAT}$ of the storage element 40, the process returns to the processes from Step ST103.

When the input voltage VIN is lower than the voltage $V_{BAT}$ of the storage element 40, it is determined whether or not the output voltage VC1 of the power generating element 20 is lower than a voltage VTHR (ST122).

Then, when the output voltage VC1 is lower than the voltage VTHR, the process returns to the processes from Step ST103, and when the output voltage VC1 is higher than the voltage VTHR, the process returns to the processes from Step ST114.

In addition, when the voltage $V_{BAT}$ of the storage element 40 is determined to be higher than 4.2 V at the time of full charge in Step ST120, the system feed function is turned on (ST123).

Then, it is determined whether or not the voltage $V_{BAT}$ of the storage element 40 is lower than 4.1 V obtained by limiting 4.2 V at the time of full charge (ST124), and when the voltage $V_{BAT}$ of the storage element 40 is lower than 4.1 V, the system feed function is turned off (ST125), and the process returns to the processes from Step ST103.

Note that, when the current voltage limiting circuit 37 limits power feeding, it is also possible to control the backflow prevention function of the backflow prevention circuit 36 to be stopped.

This control can be configured to be performed directly by the current voltage limiting circuit 37, or by the first control unit 34 or the second control unit 35.

In addition, the second control unit 35 can also perform control so that the voltage conversion unit 31 is turned off at the time of full charge by monitoring the voltage $V_{BAT}$ of the storage element 40 that is a secondary battery.

Figure 28:
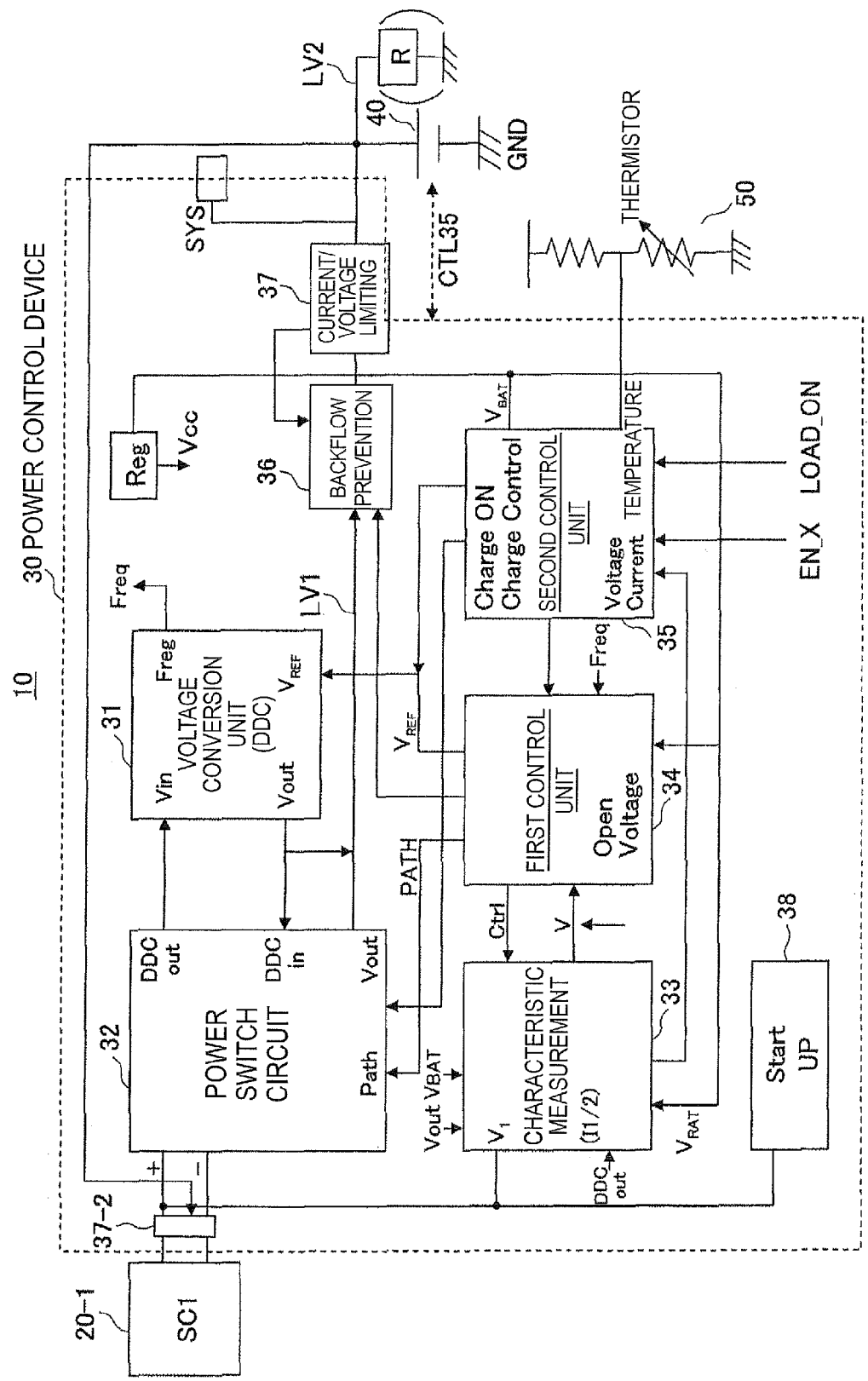
FIG. 28 is a diagram showing an example in which the current-voltage limiting circuit according the embodiment of the present disclosure is disposed not only in an output stage but also in an input stage of the power control device.

In addition, as shown in FIG. 28, when a current voltage limiting circuit 37-2 is disposed in the connection unit of the power generating element 202 and power generated from the power generating element 20 is equal to or higher than a given value, supply power can be limited.

Also in this case, when the current voltage limiting circuit 37-2 limits power supply, the backflow prevention circuit 36 can be controlled to stop the backflow prevention function.

In the configuration of FIG. 28, the case in which the current voltage limiting circuit is disposed in the input stage and the output stage of the power control device 30 has been exemplified, but the circuit can also be configured to be disposed in either stage.

<5. When Solar Batteries of Different Types are Used>

Figure 29:
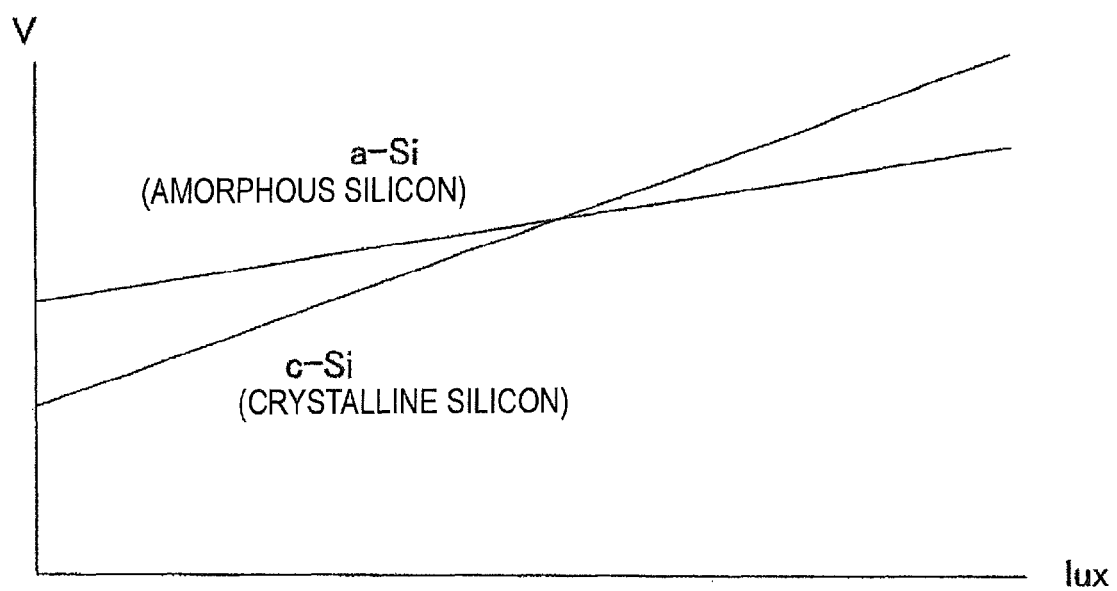
FIG. 29 is a diagram showing that a change rate of a voltage with respect to illuminance (an open voltage or a maximum power point voltage) differs depending on the type of a solar battery.

FIG. 29 is a diagram showing that a change rate of a voltage with respect to illuminance (an open voltage or a maximum power point voltage) differs depending on the type of a solar battery.

Amorphous silicon (a-Si) has a low change rate with respect to illuminance.

Crystalline silicon (c-Si) has a high change rate with respect to illuminance.

In addition, an output of a solar battery having a high change rate of a voltage is controlled so that step-up is performed with a DC-DC converter as the voltage conversion unit 31 when the voltage (open voltage or maximum power point voltage) is lower than or equal to V1.

In addition, when the voltage is equal to or higher than a constant voltage V2, it is controlled to step down with the DC-DC converter. When the voltage is between V1 and V2, an output is performed by directly coupling the power generating element 20 with the storage element 40 side without passing the DC-DC converter.

According to the feed system of the present embodiment, charge (storage) of power from the power generating element 20 of a solar battery, or the like in the storage element (battery) 40 that is a secondary battery is possible not only under sunlight but also under an ordinary environment including in a shady area, under indirect light, in a bright interior, and the like.

Particularly, it can be controlled to maintain the maximum power point of the power generating element such as a solar battery, or the like, and a power loss can be avoided.

In addition, the procedure described in the embodiment of the present disclosure can be understood as a method including such a series of procedures, or may be understood as a program for causing a computer to execute the series of procedures or a recording medium in which the program is stored. As the recording medium, for example, a CD (Compact Disc), an MD (Mini Disc), a DVD (Digital Versatile Disc), a memory card, a Blu-ray Disc (registered trademark), or the like can be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

10 . . . feed system, 20 . . . power generating element, 30 . . . power control device, 31 . . . voltage conversion unit, 32 . . . power switch circuit (power path switching unit), 33 . . . characteristic measurement circuit, 34 . . . first control unit, 35 . . . second control unit, 36 . . . backflow prevention circuit, 37 . . . current voltage limiting circuit, 38 . . . start-up circuit, 40 . . . storage element

The invention claimed is:

1. A power control device comprising:
   a power path switching unit that is able to be connected to a power generating element and switches a power path to a storage element on a load side according to a path switching signal;
   a voltage conversion unit that converts a voltage level of power generated in the power generating element and supplied through the power path switching unit so as to be able to be supplied to the storage element on the load side;
   a characteristic measurement circuit that has a function of measuring an open voltage of the power generating element and obtains a maximum power point voltage of the power generating element based on a measured open voltage; and
   a control unit that outputs, to the power path switching unit, the path switching signal according to a comparison result between the storage element on the load side and a switching threshold value generated according to at least a magnitude relationship between a voltage of the storage element on the load side and a maximum power point voltage out of the open voltage and the maximum power point voltage of the power generating element,
   wherein the power path switching unit forms a path in which an output of the power generating element is connected to the storage element side by connecting the power generating element to the voltage conversion unit, or a path in which the power generating element is directly connected to the storage element side according to the path switching signal.

2. The power control device according to claim 1,
   wherein the voltage conversion unit includes a step-up system that steps up an input voltage, and
   wherein the control unit sets a voltage that is equal to or higher than the maximum power point voltage and lower than or equal to the open voltage of the power generating element to be the switching threshold value, outputs the path switching signal to the power path switching unit so as to form a path in which the power generating element is directly connected to the storage element side when the voltage of the storage element is lower than or equal to the switching threshold value, and outputs the path switching signal to the power path switching unit so as to form a path in which the output of the power generating element is connected to the storage element side by connecting the power generating element to the voltage conversion unit when the voltage of the storage element is equal to or higher than the switching threshold value.

3. The power control device according to claim 2,
   wherein the control unit outputs the path switching signal to the power path switching unit so as to form a path in which the output of the power generating element is connected to the storage element side by connecting the power generating element to the voltage conversion unit when the voltage of the storage element is equal to or higher than the switching threshold value, and the maximum power point voltage of the power generating element is equal to or higher than a minimum compensation threshold voltage for a power generation output voltage of the power generating element that is set in advance.

4. The power control device according to claim 3,
   wherein the control unit outputs the path switching signal to the power path switching unit so as to form a path in which the power generating element is directly connected to the storage element side when the voltage of the storage element is equal to or higher than the switching threshold value and lower than or equal to the open voltage, and the maximum power point voltage of the power generating element is lower than the minimum compensation threshold voltage for the power generation output voltage of the power generating element that is set in advance.

5. The power control device according to claim 3, wherein the control unit causes a terminal on the storage element side to be open when the voltage of the storage element is equal to or higher than the open voltage, and the maximum power point voltage of the power generating element is lower than the minimum compensation threshold voltage for the power generation output voltage of the power generating element that is set in advance.

6. The power control device according to claim 1, wherein the voltage conversion unit includes a step-down system that steps down an input voltage, and wherein the control unit sets a voltage that is lower than or equal to the maximum power point voltage of the power generating element to be the switching threshold value, outputs the path switching signal to the power path switching unit so as to form a path in which the output of the power generating element is connected to the storage element side by connecting the power generating element to the voltage conversion unit when the voltage of the storage element is lower than or equal to the switching threshold value, and outputs the path switching signal to the power path switching unit so as to form a path in which the power generating element is directly connected to the storage element side when the voltage of the storage element is equal to or higher than the switching threshold value.

7. The power control device according to claim 6, wherein the control unit outputs the path switching signal to the power path switching unit so as to form a path in which the output of the power generating element is connected to the storage element side by connecting the power generating element to the voltage conversion unit when the voltage of the storage element is lower than or equal to the switching threshold value, and the maximum power point voltage of the power generating element is lower than or equal to a maximum compensation threshold voltage for a power generation output voltage of the power generating element that is set in advance.

8. The power control device according to claim 7, wherein the control unit outputs the path switching signal to the power path switching unit so as to form a path in which the power generating element is directly connected to the storage element side when the voltage of the storage element is lower than or equal to the switching threshold value, and the maximum power point voltage of the power generating element is higher than the maximum compensation threshold voltage for the power generation output voltage of the power generating element that is set in advance.

9. The power control device according to claim 1, further comprising:
a backflow prevention circuit that has a function of preventing backflow from the load side when the potential on the load side is higher than the potential of a power supply line.

10. The power control device according to claim 1, further comprising:
a limiting circuit that limits power supply so that a supply voltage to the storage element becomes a voltage lower than a full charge voltage as a limiting circuit that causes the storage element on the load side to be charged by supplying power of the power generating element thereto and is able to limit the supply power.

11. The power control device according to claim 1, further comprising:
a limiting circuit that limits power supply so that a supply voltage to the storage element becomes a voltage lower than a full charge voltage as a limiting circuit that causes the storage element on the load side to be charged by supplying power of the power generating element thereto and is able to limit the supply power,
wherein the control unit causes the function of preventing backflow of the backflow prevention circuit to be stopped when the limiting circuit limits power supply.

12. A power control method when a power path is switched in which a power generating element is to be connected to a voltage conversion unit that is able to supply a voltage to the storage element on the load side or directly connected to the storage element on the load side by converting a voltage level of power generated in the power generating element, comprising:
measuring an open voltage of the power generating element;
acquiring a maximum power point voltage of the power generating element based on a measured open voltage;
setting a switching threshold value according to at least a magnitude relationship between a voltage of the storage element on the load side and a maximum power point voltage out of the open voltage and the maximum power point voltage of the power generating element; and
forming a path in which an output of the power generating element is connected to the storage element side by connecting the power generating element to the voltage conversion unit or a path in which the power generating element is directly connected to the storage element side according to a comparison result of the storage element on the load side and the switching threshold value.

13. The power control method according to claim 12, wherein the voltage conversion unit includes a step-up system that steps up an input voltage, sets a voltage that is equal to or higher than the maximum power point voltage and lower than or equal to the open voltage of the power generating element to be the switching threshold value, forms a path in which the power generating element is directly connected to the storage element side when the voltage of the storage element is lower than or equal to the switching threshold value, and forms a path in which the output of the power generating element is connected to the storage element side by connecting the power generating element to the voltage conversion unit when the voltage of the storage element is equal to or higher than the switching threshold value.

14. The power control method according to claim 13, wherein a path in which the output of the power generating element is connected to the storage element side by connecting the power generating element to the voltage conversion unit is formed when the voltage of the storage element is equal to or higher than the switching threshold value, and the maximum power point voltage of the power generating element is equal to or higher than a minimum compensation threshold voltage for a power generation output voltage of the power generating element that is set in advance.

15. The power control method according to claim 14, wherein a path in which the power generating element is directly connected to the storage element side is formed when the voltage of the storage element is equal to or higher than the switching threshold value and lower than or equal to the open voltage, and the maximum power point voltage of the power generating element is lower than the minimum compensation threshold voltage for the power generation output voltage of the power generating element that is set in advance.

16. The power control method according to claim 14, wherein a terminal on the storage element side is open when the voltage of the storage element is equal to or higher than the open voltage, and the maximum power point voltage of the power generating element is lower than the minimum compensation threshold voltage for the power generation output voltage of the power generating element that is set in advance.

17. The power control method according to claim 12,
wherein the voltage conversion unit includes a step-down system that steps down an input voltage, and
wherein a voltage that is lower than or equal to the maximum power point voltage of the power generating element is set to be the switching threshold value, a path in which the output of the power generating element is connected to the storage element side by connecting the power generating element to the voltage conversion unit is formed when the voltage of the storage element is lower than or equal to the switching threshold value, and a path in which the power generating element is directly connected to the storage element side is formed when the voltage of the storage element is equal to or higher than the switching threshold value.

18. The power control method according to claim 17, wherein a path in which the output of the power generating element is connected to the storage element side by connecting the power generating element to the voltage conversion unit is formed when the voltage of the storage element is lower than or equal to the switching threshold value, and the maximum power point voltage of the power generating element is lower than or equal to a maximum compensation threshold voltage for a power generation output voltage of the power generating element that is set in advance.

19. The power control method according to claim 18, wherein a path in which the power generating element is directly connected to the storage element side is formed when the voltage of the storage element is lower than or equal to the switching threshold value, and the maximum power point voltage of the power generating element is higher than the maximum compensation threshold voltage for the power generation output voltage of the power generating element that is set in advance.

20. A feed system comprising:
a power generating element that generates power;
a storage element that stores the power generated in the power generating element; and
a power control device that supplies the power of the power generating element to the storage element on a load side,
wherein the power control device includes a power path switching unit that is able to be connected to a power generating element and switches a power path to a storage element on a load side according to a path switching signal; a voltage conversion unit that converts a voltage level of power generated in the power generating element and supplied through the power path switching unit so as to be able to be supplied to the storage element on the load side; a characteristic measurement circuit that has a function of measuring an open voltage of the power generating element and obtains a maximum power point voltage of the power generating element based on a measured open voltage; and a control unit that outputs, to the power path switching unit, the path switching signal according to a comparison result between the storage element on the load side and a switching threshold value generated according to at least a magnitude relationship between a voltage of the storage element on the load side and a maximum power point voltage out of the open voltage and the maximum power point voltage of the power generating element,
wherein the power path switching unit forms a path in which an output of the power generating element is connected to the storage element side by connecting the power generating element to the voltage conversion unit, or a path in which the power generating element is directly connected to the storage element side according to the path switching signal.

21. A power control device comprising:
a control unit that performs control to charge power generated in a power generating element in a storage element on a load side,
wherein the control unit monitors a voltage of the storage element, and when a voltage of a terminal of the storage element during opening reaches or exceeds a full charge voltage, or when the difference between the charge voltage of the storage element before opening and the voltage during opening of the terminal of the storage element reaches or is below a given value, performs charge control to stop charging, and changes a terminal opening time interval of the storage element according to a voltage or a current of the storage element or the power generating element.

22. The power control device according to claim 21, wherein the control unit monitors the voltage of the storage element, and when a voltage of the terminal of the storage element during opening reaches or exceeds the full charge voltage, or when the difference between the charge voltage of the storage element before opening and the voltage at the time of opening of the terminal of the storage element reaches or is below a given value, performs charge control to stop charging, and controls so as to shorten the terminal opening time interval of the storage element as the voltage of the storage element becomes higher.

23. The power control device according to claim 21, wherein the control unit monitors the voltage of the storage element, and when a voltage of the terminal of the storage element during opening reaches or exceeds the full charge voltage, or when the difference between the charge voltage of the storage element before opening and the voltage at the time of opening of the terminal of the storage element reaches or is below a given value, performs charge control to stop charging, and controls so as to shorten the terminal opening time interval of the storage element as an output voltage of the power generating element becomes higher.

24. The power control device according to claim 21, wherein, when the voltage of the storage element is equal to or higher than a full charge open voltage, or when the difference between the charge voltage of the storage element before opening and the voltage of the terminal of the storage element during opening is lower than or equal to a given value, the control unit performs control to change the terminal opening time interval of the storage element according to a voltage or a current of the storage element or the power generating element.

25. The power control device according to claim 21,
wherein the control unit controls so that full charge with the terminal of the storage element open is not detected until the voltage of the storage element reaches the full charge voltage.

26. The power control device according to claim 25,
wherein the control unit controls so that full charge with the terminal of the storage element open is detected after the voltage of the storage element reaches the full charge voltage.

27. The power control device according to claim 21, further comprising:
a limiting circuit that limits power supply such that power of the power generating element is supplied to the storage element on the load side so as to be charged, and a supply voltage to the storage element becomes a voltage lower than a full charge voltage using a limiting circuit that is able to limit the supply power.

28. The power control device according to claim 21, further comprising:
a limiting circuit that limits power supply such that power of the power generating element is supplied to the storage element on the load side so as to be charged, and a supply voltage to the storage element becomes a voltage lower than a full charge voltage using a limiting circuit that is able to limit the supply power,
wherein the control unit causes the function of preventing backflow of the backflow prevention circuit to be stopped when the limiting circuit limits power supply.

29. The power control device according to claim 21, further comprising:
a backflow prevention circuit that has a function of preventing backflow from the load side when the potential on the load side is higher than the potential of a power supply line.

30. A power control device, comprising:
a control unit that performs control to charge power generated in a power generating element in a storage element on a load side,
wherein the control unit monitors a voltage of the storage element, and when a voltage of a terminal of the storage element during opening reaches or exceeds a full charge voltage, or when the difference between the charge voltage of the storage element before opening and the voltage during opening of the terminal of the storage element reaches or is below a given value, performs charge control to stop charging, and controls so that full charge with the terminal of the storage element open is not detected until the voltage of the storage element reaches the full charge voltage.

31. The power control device according to claim 30,
wherein the control unit controls so that full charge with the terminal of the storage element open is detected after the voltage of the storage element reaches the full charge voltage.

32. A power control method when charge control of power generated from a power generating element is performed for a storage element on a load side, comprising:
monitoring a voltage of the storage element, and when a voltage of a terminal of the storage element during opening reaches or exceeds a full charge voltage, or when the difference between the charge voltage of the storage element before opening and the voltage during opening of the terminal of the storage element reaches or is below a given value, performing charge control to stop charging; and
changing a terminal opening time interval of the storage element according to a voltage or a current of the storage element or the power generating element.

33. The power control method according to claim 32,
wherein the terminal opening time interval is controlled to be shortened as the voltage of the storage element becomes higher.

34. The power control method according to claim 32,
wherein the terminal opening time interval is controlled to be shortened as an output voltage of the power generating element becomes higher.

35. The power control method according to claim 32,
wherein full charge with the terminal of the storage element open is not detected until the voltage of the storage element reaches the full charge voltage.

36. A power control method when charge control of power generated from a power generating element is performed on a storage element on a load side, comprising:
monitoring a voltage of the storage element, and when a voltage of a terminal of the storage element during opening reaches or exceeds a full charge voltage, or when the difference between the charge voltage of the storage element before opening and the voltage during opening of the terminal of the storage element reaches or is below a given value, performing charge control to stop charging; and
controlling such that full charge with the terminal of the storage element open is not detected until the voltage of the storage element reaches the full charge voltage.

37. The power control method according to claim 36,
wherein full charge with the terminal of the storage element open is detected after the voltage of the storage element reaches the full charge voltage.

38. A feed system, comprising:
a power generating element that generates power;
a storage element that stores power generated in the power generating element; and
a power control device that supplies power of the power generating element to the storage element,
wherein the power control device includes a control unit that performs charge control of power generated in the power generating element on the storage element on a load side, and
wherein the control unit monitors a voltage of the storage element, and when a voltage of a terminal of the storage element during opening reaches or exceeds a full charge voltage, or when the difference between the charge voltage of the storage element before opening and the voltage during opening of the terminal of the storage element reaches or is below a given value, performs charge control to stop charging; and changes a terminal opening time interval of the storage element according to a voltage or a current of the storage element or the power generating element.

39. A feed system, comprising:
a power generating element that generates power;
a storage element that stores power generated in the power generating element; and
a power control device that supplies power of the power generating element to the storage element,
wherein the power control device includes a control unit that performs charge control of power generated in the power generating element on the storage element on a load side, and
wherein the control unit monitors a voltage of the storage element, and when a voltage of a terminal of the storage element during opening reaches or exceeds a full charge voltage, or when the difference between the charge voltage of the storage element before opening and the voltage during opening of the terminal of the storage element reaches or is below a given value, performs charge control to stop charging; and controls such that full charge with the terminal of the storage element open is not detected until the voltage of the storage element reaches the full charge voltage.

* * * * *